United States Patent
Kirch et al.

(10) Patent No.: US 7,194,981 B2
(45) Date of Patent: Mar. 27, 2007

(54) RAWHIDE PET CHEW

(75) Inventors: Robert J. Kirch, Parker, CO (US);
Jack W. Renforth, Aurora, CO (US)

(73) Assignee: Aspen Pet Products, Inc., Denver, CO (US)

( * ) Notice: Subject to any disclaimer, the term of this patent is extended or adjusted under 35 U.S.C. 154(b) by 155 days.

(21) Appl. No.: 11/011,675

(22) Filed: Dec. 14, 2004

(65) Prior Publication Data
US 2005/0271775 A1 Dec. 8, 2005

Related U.S. Application Data

(63) Continuation-in-part of application No. 10/197,099, filed on Jul. 16, 2002, now Pat. No. 6,840,196, which is a continuation-in-part of application No. 29/157,161, filed on Mar. 13, 2002, now Pat. No. Des. 476,118, which is a continuation-in-part of application No. 29/157,162, filed on Mar. 13, 2002, now Pat. No. Des. 479,369.

(51) Int. Cl.
*A00K 29/00* (2006.01)

(52) U.S. Cl. ...................................... 119/710

(58) Field of Classification Search ............... 119/702, 119/707–712; 426/2, 92, 132, 635, 805, 426/807, 641, 315
See application file for complete search history.

(56) References Cited

U.S. PATENT DOCUMENTS

| 1,727,342 | A | * | 9/1929 | Goodwin | 426/94 |
|---|---|---|---|---|---|
| 2,051,682 | A | * | 8/1936 | Couture | 426/138 |
| 2,988,045 | A | | 6/1961 | Fisher | |
| D195,168 | S | | 5/1963 | Oaks | |
| D197,595 | S | | 3/1964 | Savitt | |
| 3,368,528 | A | * | 2/1968 | Ganoe | 119/709 |
| 4,535,725 | A | | 8/1985 | Fisher | |
| 5,200,212 | A | | 4/1993 | Axelrod | |
| 5,673,653 | A | * | 10/1997 | Sherrill | 119/709 |
| 5,786,382 | A | | 7/1998 | Childers-Zadah | |
| 5,832,877 | A | * | 11/1998 | Markham | 119/710 |
| 5,897,893 | A | | 4/1999 | Mohilef | |
| 6,014,950 | A | * | 1/2000 | Rogers | 119/710 |

(Continued)

OTHER PUBLICATIONS

Advertisement: Marvi Pet Leather Products, "Manufacturers 100% Pure White Beefhide", 1 page, Sep. 1991.

(Continued)

*Primary Examiner*—Thomas Price
(74) *Attorney, Agent, or Firm*—Dorsey & Whitney LLP

(57) ABSTRACT

A rawhide pet chew is made by folding a first sheet of rawhide around at least a second sheet of rawhide and a third sheet of rawhide. The second and third sheets of rawhide are flavored to be appetizing to a pet, and the flavoring may impregnate the second and third sheets of rawhide. An edge of the second sheet of rawhide protrudes from under the first sheet to entice chewing and consumption of the pet chew by the pet. An edge of the third sheet of rawhide protrudes from under the first and second sheets to entice chewing and consumption of the pet chew by the pet. The first sheet of rawhide reduces opportunities for contact between the second and third sheets of rawhide and a decorative surface upon which the pet chew may rest.

27 Claims, 17 Drawing Sheets

U.S. PATENT DOCUMENTS

| | | | |
|---|---|---|---|
| D427,416 S | | 7/2000 | Frudakis |
| D433,778 S | | 11/2000 | Axelrod |
| 6,277,420 B1 | | 8/2001 | Andersen et al. |
| D453,864 S | | 2/2002 | Olivares et al. |
| 6,365,133 B1 | | 4/2002 | Rich |
| 6,444,243 B1 | | 9/2002 | Duensing et al. |
| D476,118 S | * | 6/2003 | Kirch .................... D30/160 |
| D477,693 S | | 7/2003 | Kirch |
| D477,695 S | | 7/2003 | Kirch |
| 2002/0185085 A1 | | 12/2002 | Sherill et al. |
| 2005/0145193 A1 | | 7/2005 | Kirch |

OTHER PUBLICATIONS

Advertisement: Walter & Hoffman Distributors, "Beef Basted Super Knotted Bones", 1 page, at least as early as 1995.

Brochure: Discount Master Animal Care, 7 pages, at least as early as Mar. 2002.

Brochure: Petcetra, Inc., "Petcetera", 2 pages, at least as early as Mar. 2002.

Catalog: Doctors Foster & Smith, Jumbo Rolled Retriever Stick, p. 106, Feb. 2000.

Catalog: Doctors Foster & Smith, Beefeaters Premium Rawhide Bones, Natural White Rawhide Bones, Super Heavyweight Beefhide Bones and Rawhide Retriever Stick, p. 104, Jan. 2001.

Catalog: Doctors Foster & Smith, Jerky Treats and Pet Pack Rawhide, p. 100, Jan. 2001.

Catalog: New England Serum Company, Premium Rawhide Bones, p. 146, Winter 2000.

Catalog: R.C. Steele Pet Supplies, Premium Rawhide Bones and Harper's Rawhide Bones, p. 78, Mar. 2000.

* cited by examiner

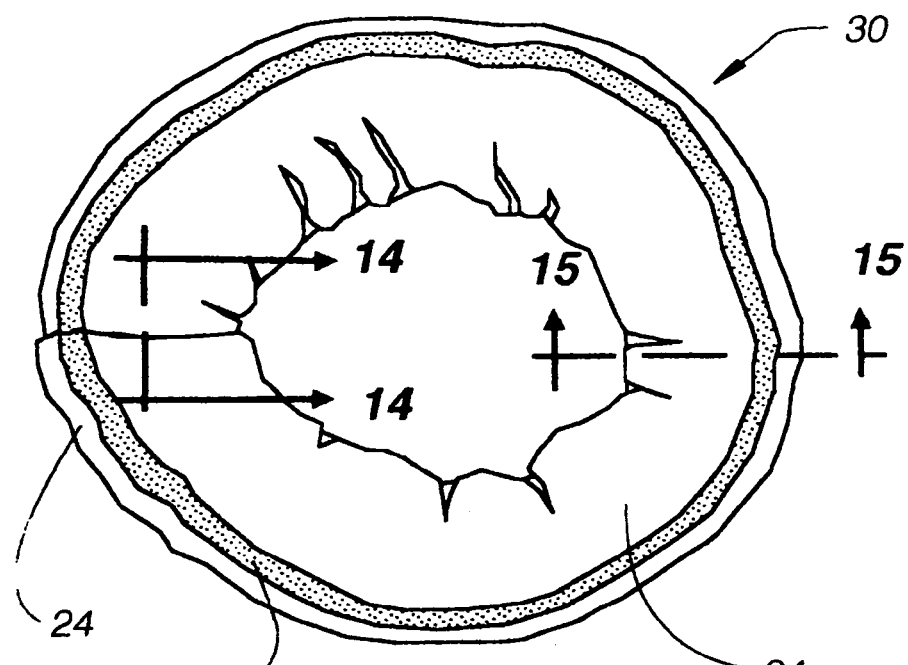
Fig. 12
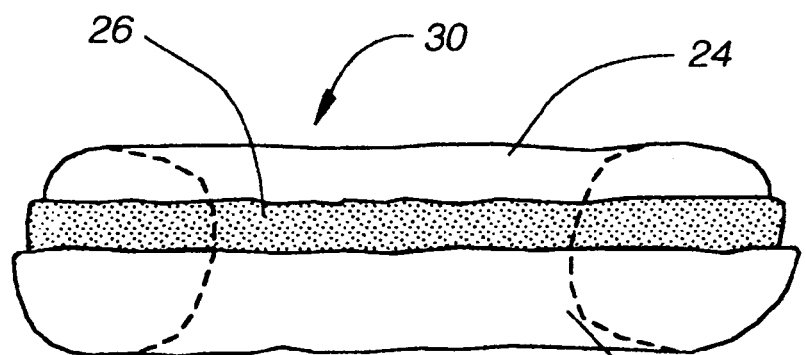
Fig. 13
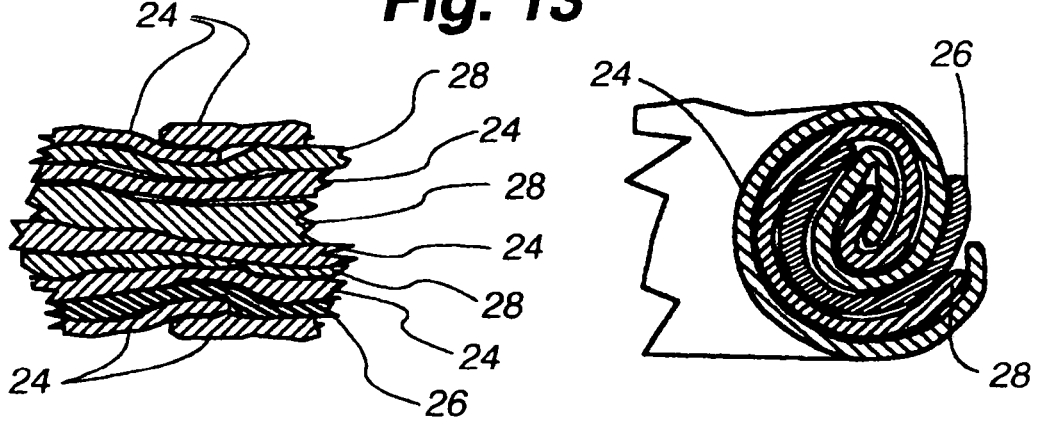
Fig. 14     Fig. 15

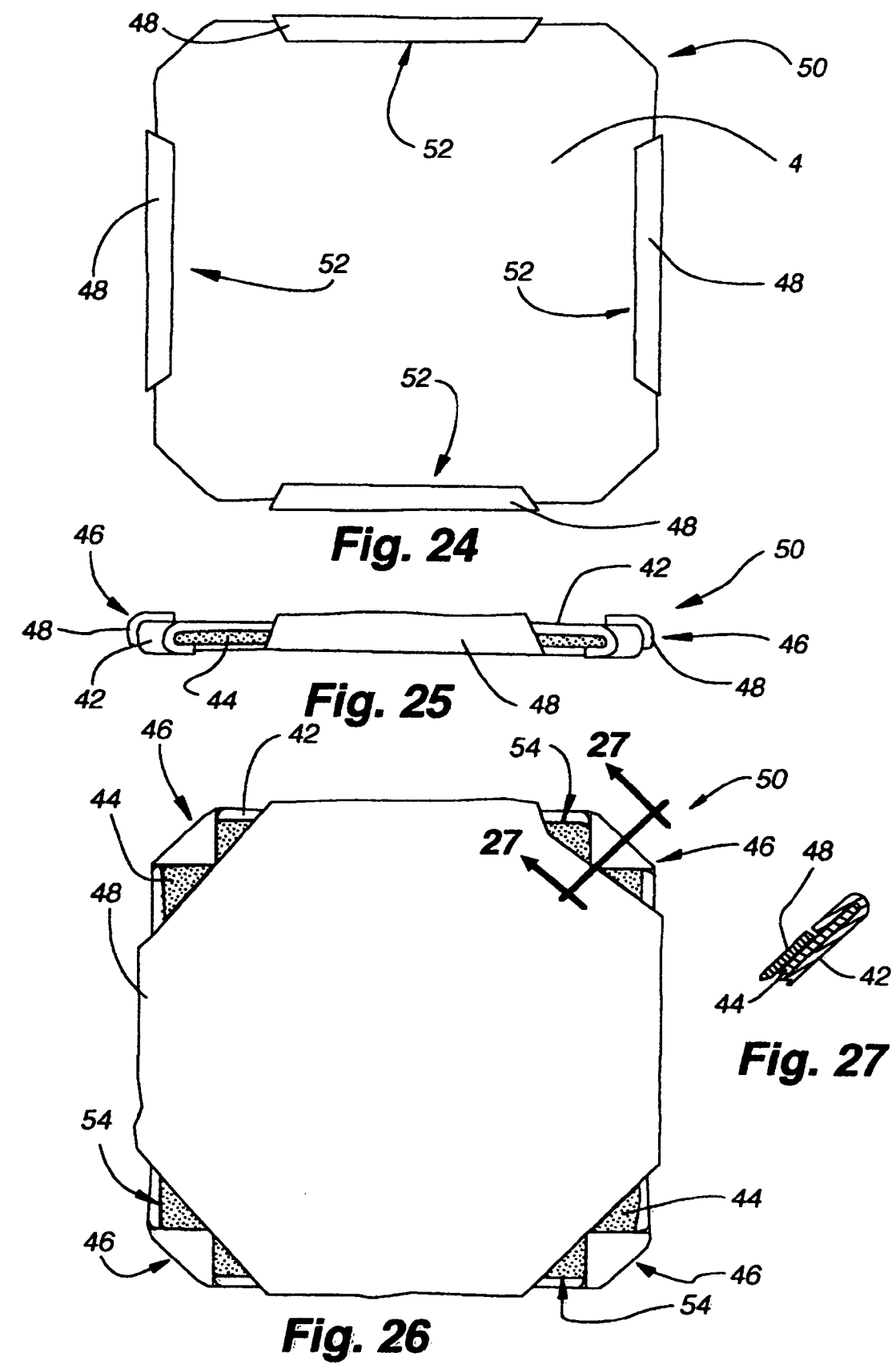

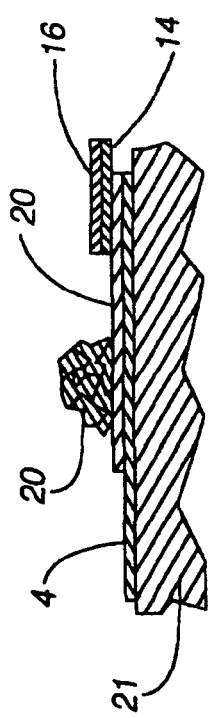
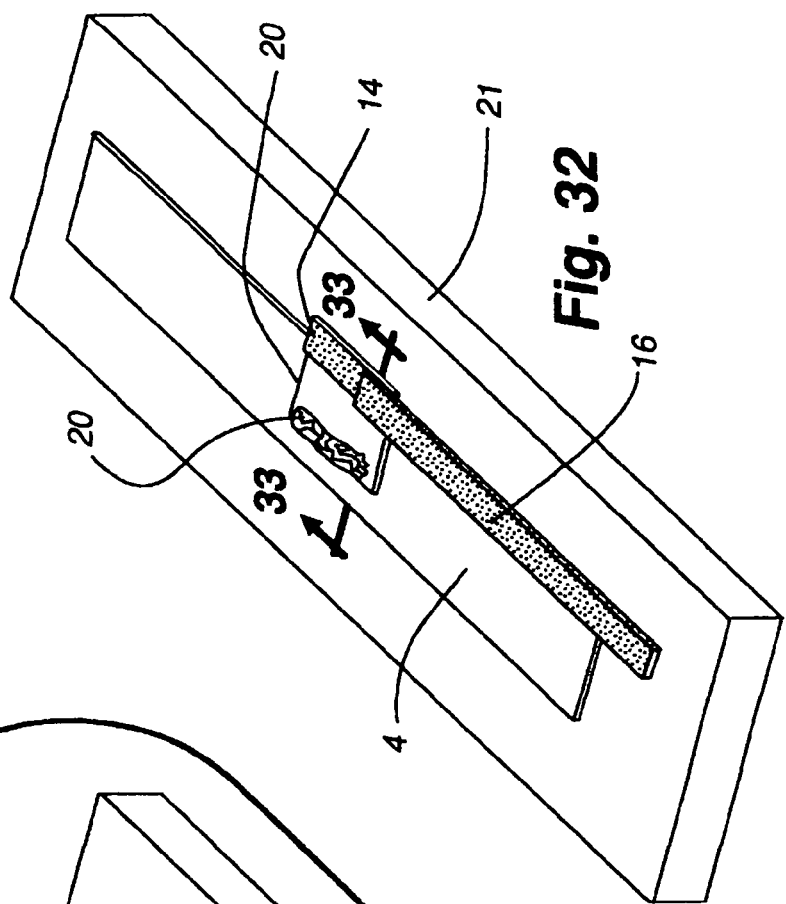
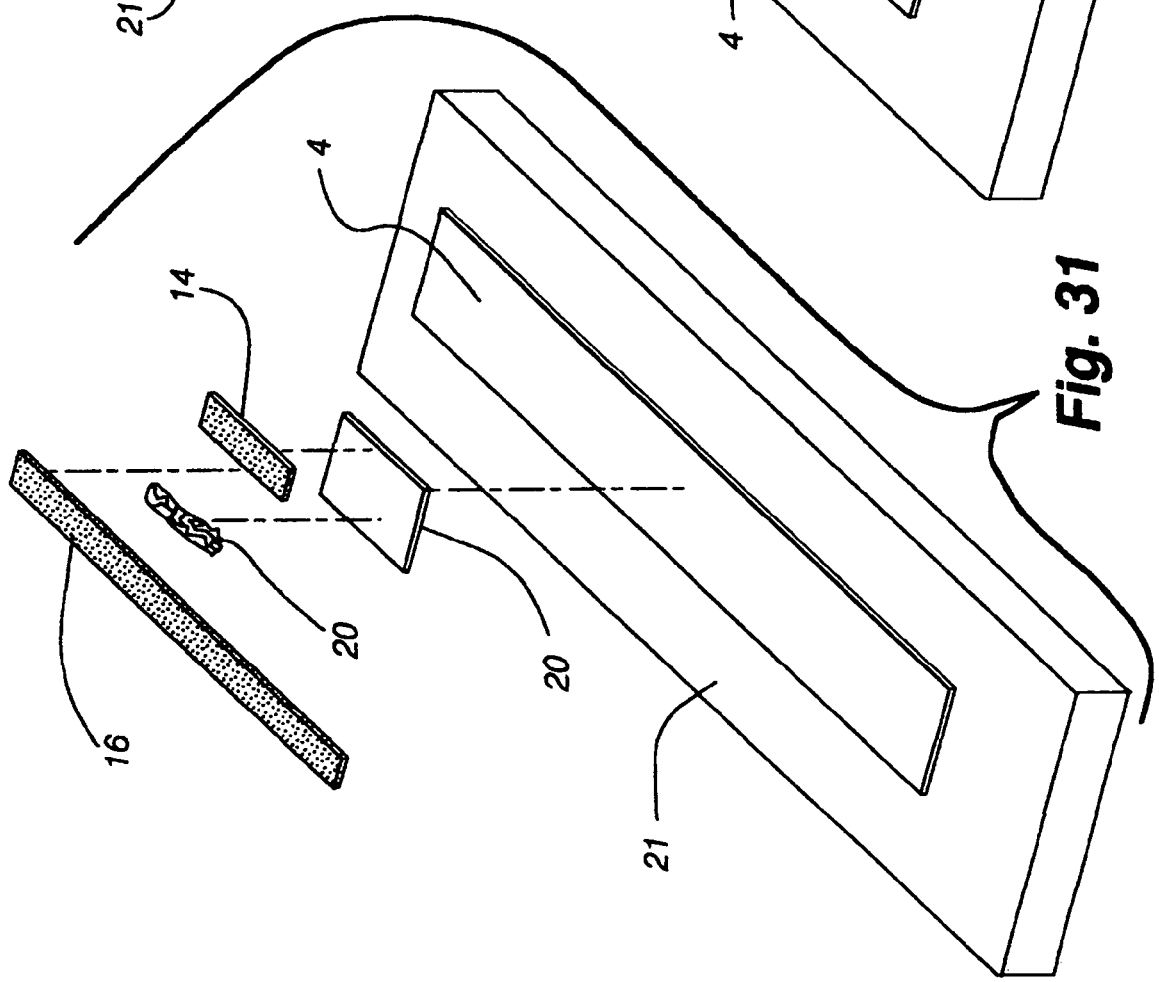

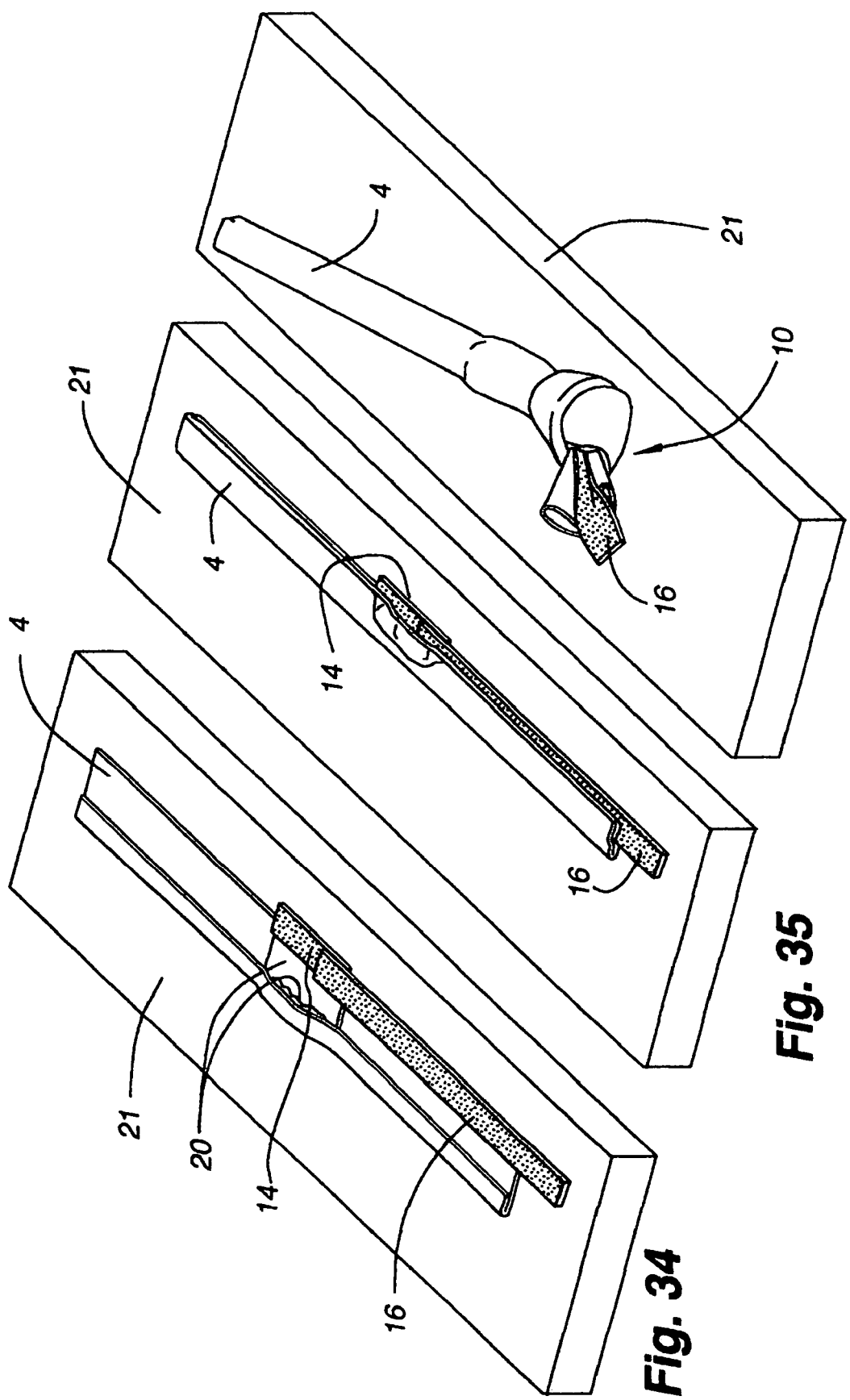

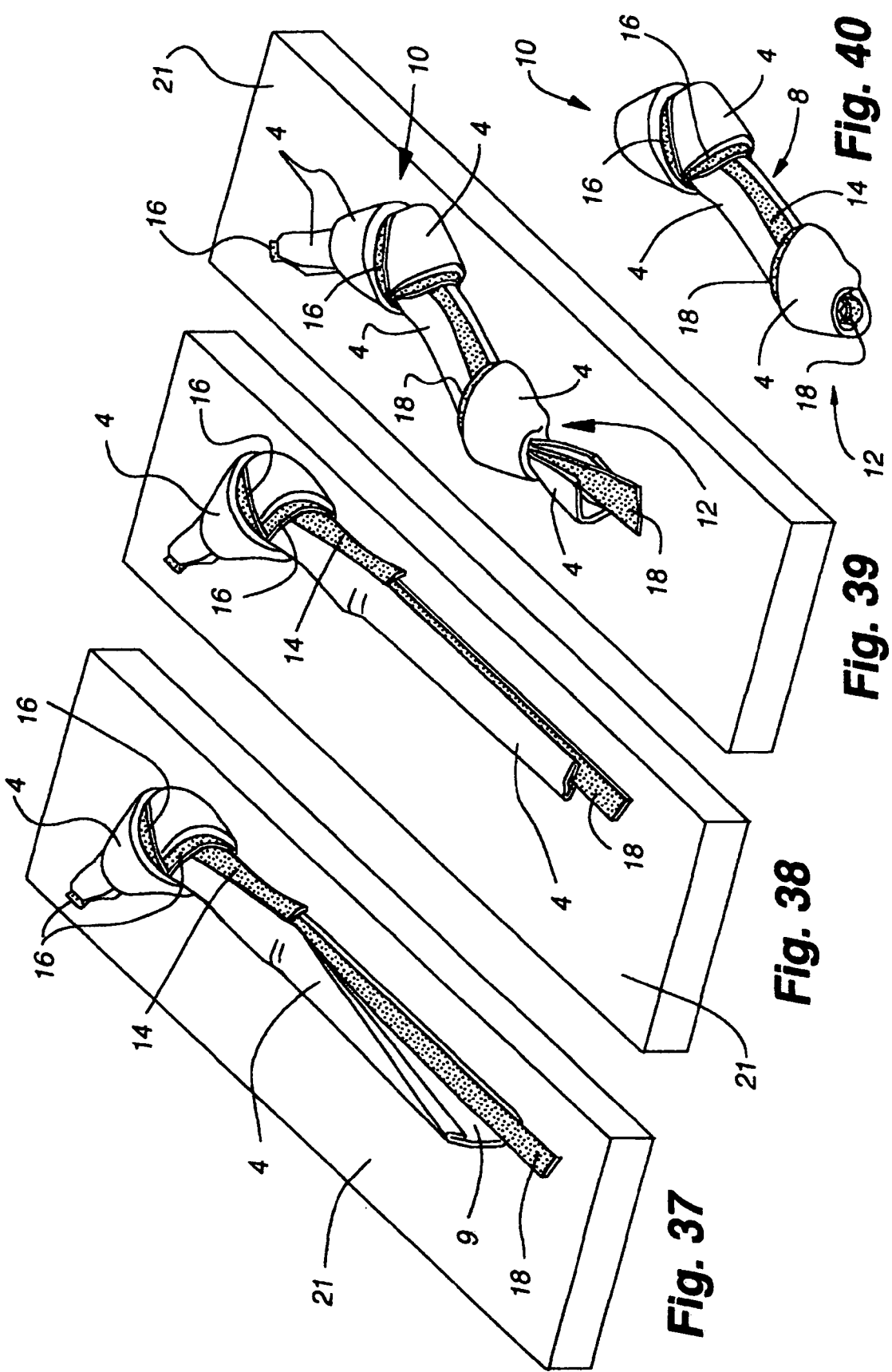

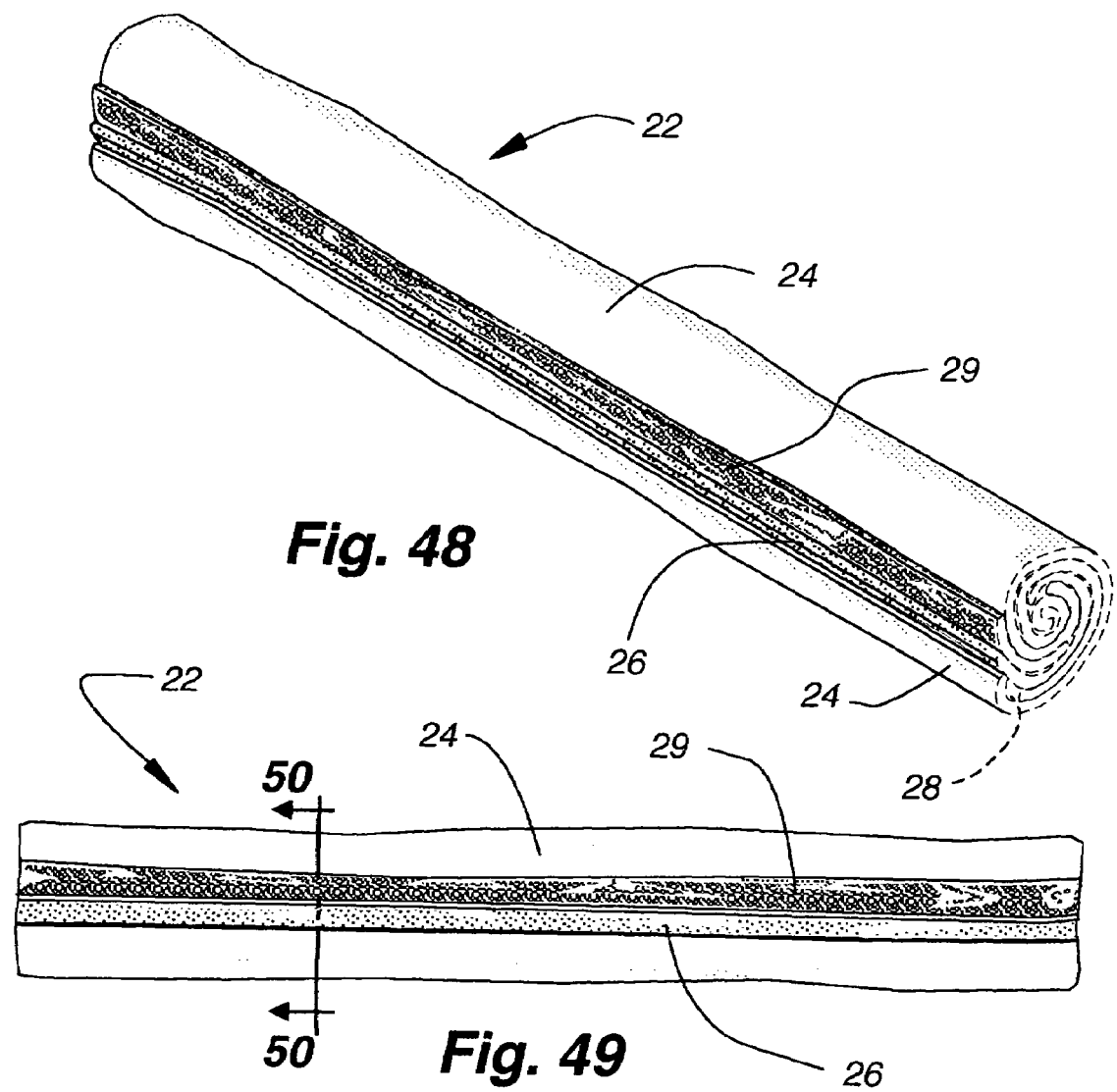
Fig. 48
Fig. 49
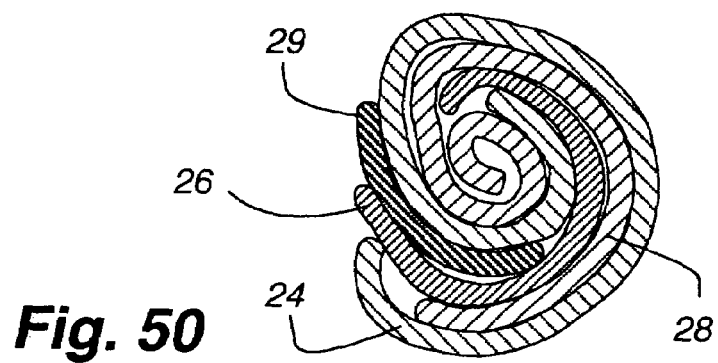
Fig. 50

RAWHIDE PET CHEW

CROSS REFERENCE TO RELATED APPLICATIONS

This application claims priority pursuant to 35 U.S.C. § 120 to the following applications, each of which is hereby incorporated by reference in its entirety as though fully set forth herein. This application is a continuation-in-part to U.S. patent application Ser. No. 10/197,099 filed 16 Jul. 2002 now U.S. Pat. No. 6,840,196 entitled "Rawhide Pet Chew," which itself is a continuation-in-part of U.S. design application No. 29/157,161, filed 13 Mar. 2002 and entitled, "Rawhide Chew Roll," now U.S. Design Pat. No. D476,118, and of U.S. design application No. 29/157,162, filed 13 Mar. 2002 now U.S. Pat. No. D.479,369 and entitled, "Rawhide Chew Bone."

BACKGROUND OF THE INVENTION

1. Field of the Invention

This invention relates to chew toys made for pets out of animal rawhide and the method of their manufacture.

2. Description of the Related Art

Rawhide pet chews are staple products sold in the consumer pet product industry. Rawhide pet chews designed particularly for dogs promote oral hygiene, provide a distraction, and reinforce the dog owner's relationship with the dog. The tough, dried rawhide of the pet chews cleans tartar and plaque off the animal's teeth when chewed. Additionally, the rawhide does not cause harm to the animal if ingested.

Unfortunately, not all animals are attracted to rawhide chews and, therefore, some pet owners cannot take advantage of this easy way to promote oral hygiene for their pets. In particular, some animals do not find the rawhide appetizing, primarily because of the lack of taste. In the typical manufacturing process of rawhide chews, the animal hides are stripped of any fat or sinew and are washed and whitened. This process inhibits spoilage and ensures a safe product for animals to ingest. However, this process also removes much of the fatty, oily taste of normal animal skin that is enticing to animals.

In order to overcome the problem of palatability of rawhide pet chews, manufacturers have attempted to add flavor to the rawhide. Methods for supplying flavor additives in the past have focused on basting or spray coating the rawhide with a gravy, marinade, or other flavor enhancement. Once coated with a gravy, the rawhide pet chew is dried so the gravy adheres to or forms a crust on the surface of the rawhide pet chew. While such surface coatings are enticing to animals, they have several drawbacks. First, once an animal starts chewing on the pet chew, the animal's saliva reconstitutes the dried gravy coating. Many times these coatings contain brightly colored dyes as well. The wet, colored, gravy coating often rubs off onto decorative surfaces on which the pet chew is laid, for example, carpeted floors and upholstered furniture, thereby soiling or staining the decorative surfaces. Additionally, once the coating is licked off by the animal, any future enticement to continue to chew the pet chew is gone and the pet chew may be ignored.

Some rawhide pet chews are manufactured from ground rawhide that is placed in a mold and either pressed together or held together with a digestible adherent. In the industry, these chews are called "munchies." The rawhide pieces may each be coated with a flavor and/or dyed before being molded, or the finished, molded munchie may be coated and/or colored after molded. The problem with the munchie-type pet chews is that they break up of disintegrate easily when the pet begins chewing on them. Thus, not only do munchies present the same problems with the transfer of gravy or dye to carpet and furniture, the problem is spread over a wider area as bits and pieces of the munchie material break off and fall in a distributed area. These small pieces can further become hidden in deep carpet or between cushions of furniture. Additionally, because the munchies disintegrate, they do not offer ongoing or long-lasting dental benefits to the animal by allowing the animal to gnaw on a rawhide chew for an extended period of time.

U.S. Pat. No. 5,673,653 to Sherrill describes an attempt to entice animals to prolong their chewing on a pet chew by wrapping a rawhide sheet around strips of meat jerky. Because part of the jerky is wrapped inside an outer rawhide layer, the animal is enticed to continue chewing the rawhide in order to reach the jerky in the interior of the pet chew. There are, however, several drawbacks to incorporating jerky meat into a pet chew. For example, Jerky meat is a relatively expensive component to use in what should be a relatively inexpensive consumer product for pets. The raw material costs of animal meat is more expensive than low grade hides. It is also more expensive and time consuming to manufacture jerky due to the long smoking process that is necessary to prevent spoilage of the meat. Even after smoking the meat to create jerky, there is still a chance that the jerky will mold without the introduction of further preservative additives.

SUMMARY OF THE INVENTION

The disclosed invention provides an all rawhide pet chew that is enticing to pets and encourages pets to chew the pet chew thoroughly throughout. The pet chew is generally made from two differently treated sheets of rawhide. The first sheet of rawhide is standard rawhide used in the manufacture of rawhide pet chews. The second sheet of rawhide is flavored by, for example, soaking it in a flavored solution (i.e., marinating the second sheet in air or in a vacuum), spray coating a flavored solution onto the second sheet, applying a gravy, basting, or steeping. Preferably, the second sheet thereby becomes impregnated by a flavor making the second sheet appetizing to a pet. The second sheet may be flavored after undergoing standard rawhide processing. The gravy or flavored solution may also include a coloring or dye to provide a visual stimulus to the second sheet of rawhide. In one embodiment, the second sheet is wrapped together with the first sheet, wherein the first sheet substantially covers the second sheet. A portion of the second sheet remains exposed to entice chewing and consumption of the pet chew by the pet. Since the second sheet is also wrapped within the first sheet, the pet is further enticed to continue chewing to reach the flavored second sheet in the interior of the pet chew. In an embodiment of the invention, the second sheet is wrapped together with the first sheet when the second sheet is semi-dry to help lock in any added flavor and color, which inhibits bleeding from the flavored second sheet to the natural first sheet, without drying the second sheet to the point where it becomes inflexible.

The pet chews may be formed into any shape visually stimulating to a pet or pet owner alike. Exemplary shapes of the disclosed pet chew may include, bone shapes, rolls, donuts or bagels, pretzels, twists, and bows or figure eights. The shapes may further provide a bias in orientation of the pet chews, whereby only portions of the first sheet of rawhide contact a generally flat surface, to the exclusion of the second sheet of rawhide, when the rawhide pet chew is placed upon the generally flat surface.

In particular, a method of making a rawhide pet chew bone with a central portion and "knuckles" on each end involves the following steps. A first strip is cut from the first sheet and a second strip is cut from the second sheet. The second strip is further cut into three sections. A first section of the second strip is placed centrally on the first strip. A second section of the second strip is placed on and along one end of the first strip, minimally overlapping the side edge of the first section of the second strip and extending beyond the long edge of the first strip. The first strip is then rolled up, wrapping the first and second sections from the second strip. The area of the first strip enclosing the first section of the second strip forms a center section of the pet chew bone. A portion of the first section of the second strip remains exposed to entice chewing and consumption of the pet chew bone by the pet.

The side of the first strip enclosing the second section of the second strip is tied in an overhand knot to form a first knuckle of the pet chew bone. While the second section of the second strip is primarily covered by the first strip, an edge of the second section remains exposed to entice chewing and consumption of the pet chew bone by the pet.

The third section of the second strip is placed on a second end of the first strip, minimally overlapping a corner of the exposed portion of the first section of the second strip. The second end of the first strip and the third section of the second strip are together tied in a second overhand knot to create a second knuckle opposite the first knuckle. The third section of the second strip on the second lateral end is primarily covered within the overhand knot by the first strip, but a portion of the third section of the second strip remains exposed to entice chewing and consumption of the pet chew bone by the pet. Any excess rawhide extending beyond the knuckles is trimmed away.

BRIEF DESCRIPTION OF THE DRAWINGS

FIG. 12 is a top plan view of a rawhide chew of a third embodiment of the invention in the shape of a donut.

FIG. 13 is an elevation view of the rawhide chew donut of FIG. 12.

FIG. 14 is a fragmentary cross-section of the rawhide chew donut of FIG. 12 in a plane as indicated in FIG. 12.

FIG. 15 is a fragmentary cross-section of the rawhide chew donut of FIG. 12 in a plane as indicated in FIG. 12.

FIG. 24 is a top plan view of an alternate configuration of a rawhide chew chip of the sixth embodiment.

FIG. 25 is a front elevation view of the alternate configuration of the rawhide chew chip of the sixth embodiment.

FIG. 26 is a bottom plan view of the alternate configuration of the rawhide chew chip of the sixth embodiment.

FIG. 27 is a fragmentary cross section of the alternate configuration of the rawhide chew chip of the sixth embodiment in the plane as indicated in FIG. 26.

FIG. 31 is a schematic of various elements used in a method of making the rawhide chew bone of FIG. 1.

FIG. 32 is a schematic of a step in a method of making the rawhide chew bone of FIG. 1.

FIG. 33 is a fragmentary cross-section of the schematic step as indicated in FIG. 32.

FIGS. 34–40 are schematic representations of steps in a method of making the rawhide chew bone of FIG. 1.

FIG. 48 is an isometric view of a rawhide chew roll according to a eighth embodiment of the invention.

FIG. 49 is a front elevation view of the rawhide chew roll of FIG. 48.

FIG. 50 is a cross-section of the rawhide chew roll of FIG. 48 in a plane as indicated in FIG. 49.

DETAILED DESCRIPTION OF THE INVENTION

Figure 1:
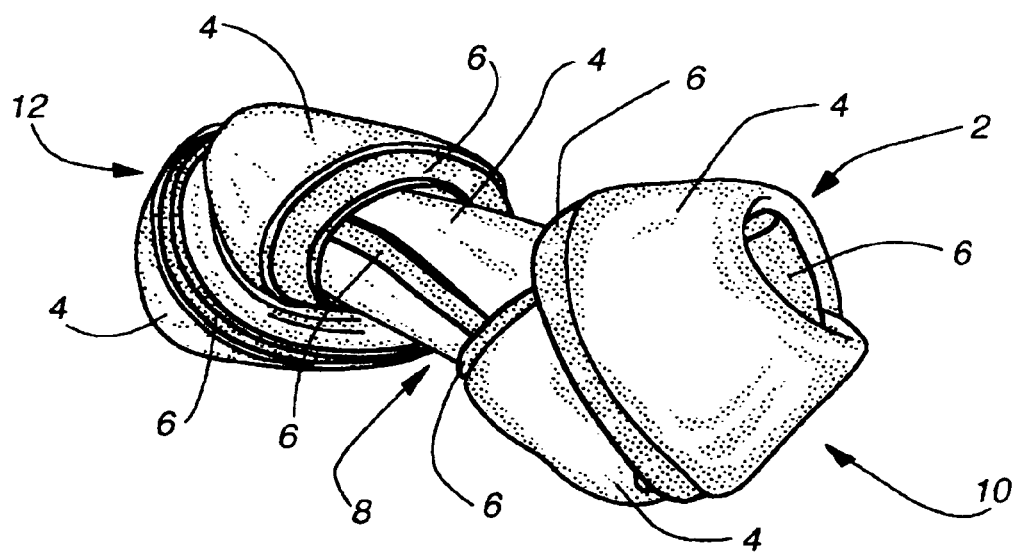
FIG. 1 is an isometric view of a rawhide chew bone according to a first embodiment of the invention.
Figure 2:
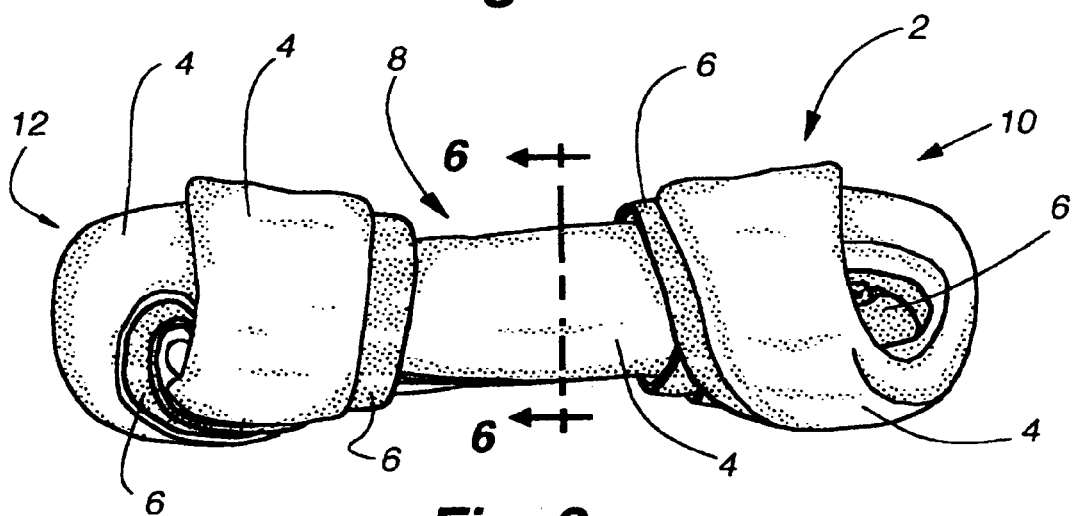
FIG. 2 is an top plan view of the rawhide chew bone of FIG. 1.
Figure 3:
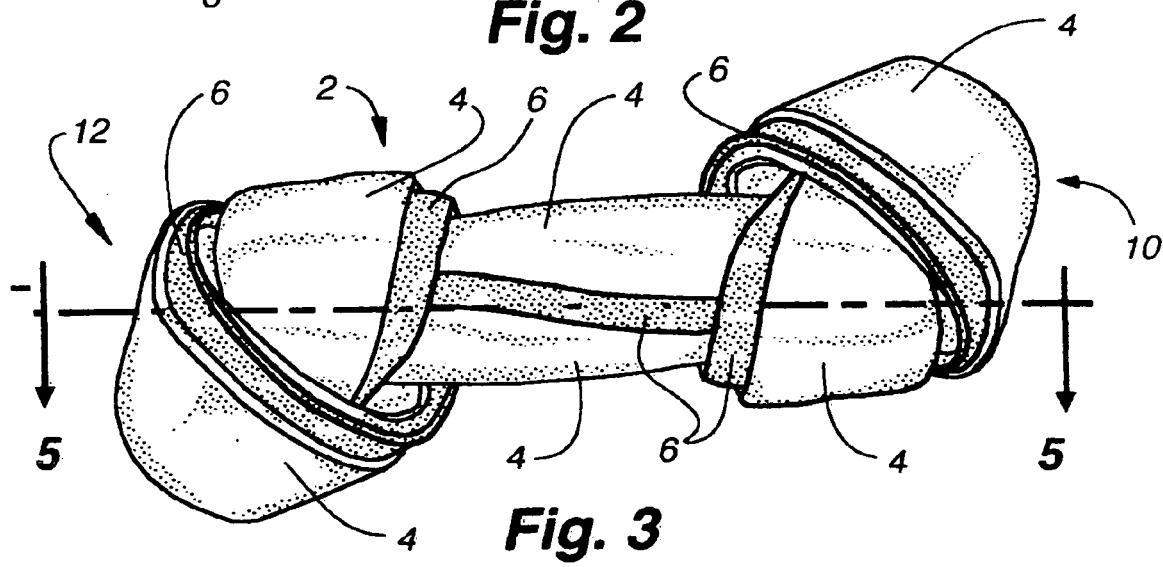
FIG. 3 is a front elevation view of the rawhide chew bone of FIG. 1.
Figure 4:
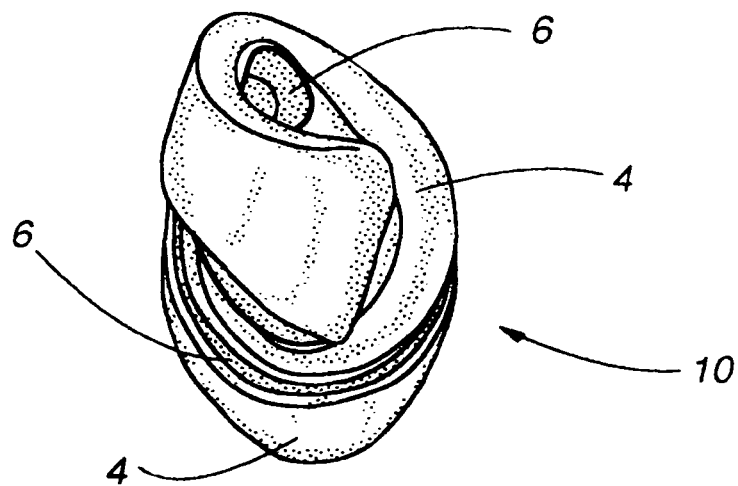
FIG. 4 is an elevation view of the right side of the rawhide chew bone of FIG. 1.
Figure 5:
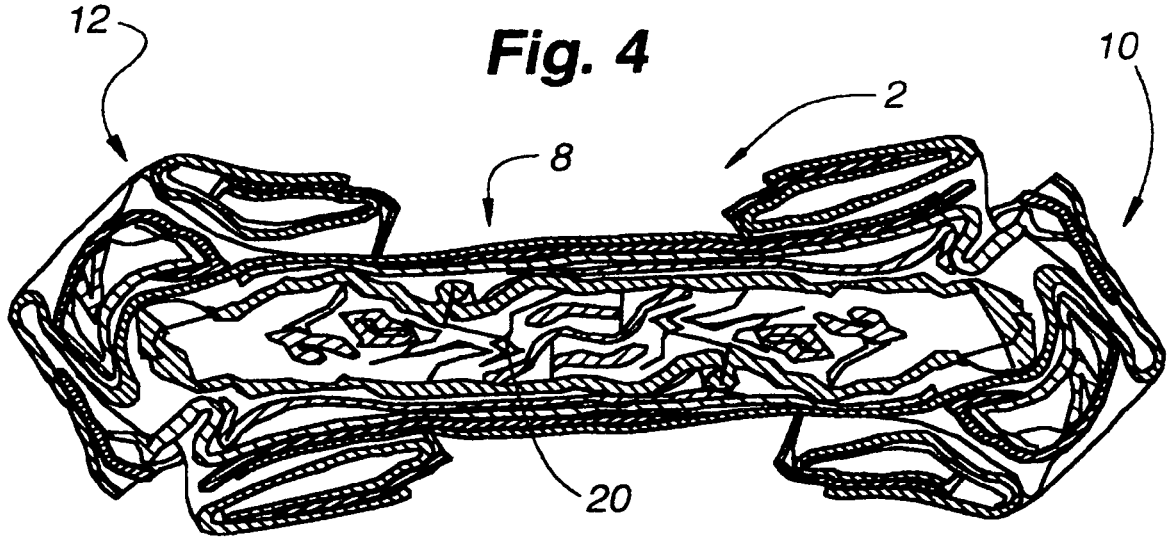
FIG. 5 is a cross-section of the rawhide chew bone of FIG. 1 in a plane as indicated in FIG. 3.
Figure 6:
FIG. 6 is a cross-section of the rawhide chew bone of FIG. 1 in a plane as indicated in FIG. 2.

Rawhide pet chews according to the present invention are generally composed of at least two different types of rawhide that ultimately undergo separate treatment processes. Initially, all the rawhide is processed according to standard practices. The rawhide is procured in the split lime state, generally as by-products from tanneries. All the hides are placed into processing drums to be washed and whitened using a solution of hydrogen peroxide. Standard practices for processing rawhide typically include additional steps that are known in the industry, for example, checking the pH of the hides.

Some of the hides are separated and dried to be further flavored with respect to the merely whitened hides. The hides may be flavored by, for example, soaking them in a flavored solution, applying a flavored coating or gravy to them, or by basting or steeping the hides in a flavored solution that is eventually dried on the surface of the hides. In one embodiment, the hides may be placed in a vacuum tank for marinating. The marinade may be a solution of natural or artificial flavoring that is enticing to pets in taste and smell. The marinade may further include a dye or other coloring to make the rawhide visually enticing to either or both the pet and the pet owner. Desirably, the flavoring technique or process used results in the impregnation of the flavoring into the rawhide, rather than merely providing a coating. Because the marinade is impregnated and is actually absorbed by the fibers of the rawhide, it is less likely to bleed or rub off onto decorative surfaces when the rawhide pet chew is chewed by a pet.

Each type of hide, both standard whitened and flavored, is then cut while still at least slightly wet into appropriate patterns to be formed into the desired pet chew. Sheets or strips, at least one each of the standard whitened hide and the flavored hide, are variously wrapped, rolled, or tied together to create various types of shaped pet chews. Generally, the flavored hide sheets or strips are substantially folded, wrapped, or rolled within, or otherwise covered by the sheet or strip of whitened hide. In each folding, wrapping, rolling, or tying method, the flavored hide pieces are arranged in such a way with respect to the respective whitened hide pieces that a small edge or other portion of the flavored hide piece is exposed to entice chewing and consumption of the finished pet chew by a pet.

Formed pet chews may be dried, for example, on racks in climate controlled chambers. Care should be taken not to dry the pet chews too quickly because, while the exterior of the pet chews may appear dry, the interior, if still moist, can mold and deteriorate before the pet chew reaches the consumer for purchase.

The inventive pet chew may be prepared in multiple forms that may variously appeal to different animals. A first embodiment is a classic dog bone-shaped pet chew 2 as depicted in FIGS. 1–6. The bone-shaped pet chew 2 is composed of a first strip 4 of rawhide generally wrapped around or folded about a second strip 6 of rawhide, wherein the first strip 4 of rawhide is folded along its length. The first strip 4 of rawhide may be a washed and whitened strip of split lime hide. The second strip 6 of rawhide may also be a washed and whitened strip of split lime hide. However, the second strip 6 of rawhide is also flavored according to one of the processes described above. An edge of the second strip 6 of rawhide should protrude from the first strip 4 of rawhide along the length of the first strip 4 of rawhide as it folds about the second strip 6 of rawhide. A bone-shaped pet chew 2 may simply be formed by tying a knot in each lateral end of the enfolded first strip 4 and second strip 6 of rawhide to create joint- or knuckle-like structures.

In order to create the specific bone-shaped pet chew 2 as shown in FIGS. 1–6 with the flavored second strip 6 exposure on the knuckles oriented symmetrically toward the center of the bone, the following steps as shown in FIGS. 31–40 may be undertaken while both strips are still at least slightly wet and pliable due to their high moisture content after washing or flavoring. For example, in a desirably sized commercial embodiment, the first strip 4 of rawhide may be a rectangular-shaped piece about three feet long and six inches wide. The second strip 6 (element 6 not shown in FIGS. 31–40) of rawhide may be slightly longer than the first strip 4, e.g., three and one-half feet long, but is narrower than the first strip 4 and may be on the order of two inches in width. The second strip 6 of rawhide is preferably cut into three sections: a middle strip 14 (see, e.g., FIGS. 31–35) approximately five to six inches long; a first side strip 16 (see, e.g., FIGS. 31–40) about one and one-half feet long; and a second side strip 18 (see, e.g., FIGS. 37–40), also about one and one-half feet long.

The first strip 4 of rawhide is laid flat on a work surface 21 as shown in FIGS. 31 and 32. The middle strip 14 is then placed centrally along the length of the first strip 4 such that the top edge portion of the middle strip 14 extends slightly above the adjacent top edge of the first strip 4 as shown to good advantage in FIG. 32. Next, the first side strip 16 is placed along the length of the first strip 4 to one side of the middle strip 14, slightly overlapping the adjacent side edge of the middle strip 14 and also extending slightly above the adjacent top edge of the first strip 4. Optionally, remnants 20 (see, e.g., FIGS. 32 and 33), of rawhide may be placed centrally on the first strip 4 below the middle strip 14 to add bulk to the bone-shaped pet chew 2. The bottom quarter to third of the first strip 4 is then folded over, upward toward the middle strip 14, and covers at least a portion of the remnants 20 (see FIG. 34). The first strip 4 is further rolled upward to wrap the middle strip 14 and the first side strip 16 substantially within the first strip 4, while the top edge portions of the middle strip 14 and the first side strip 16 extend beyond the exterior seam created by rolling the first strip 4 (see FIG. 35). The portion of the pet chew 2 containing the first side strip 16 is then tied in an overhand knot to create a first knuckle 10 for the bone-shaped pet chew 2 (see FIG. 36). Any excess rawhide of the first strip 4 and the first side strip 16 extending beyond the knot creating the first knuckle 10 may be trimmed away.

The partially completed bone-shaped pet chew 2 may be flipped and rotated to the orientation shown in FIG. 37, if desired, for easier completion of the further steps. The second side strip 18 is next placed within the fold 9 of the rolled first strip 4 on the side opposite the now completed first knuckle 10. The second side strip 18 is placed slightly overlapping the exposed adjacent side edge of the middle strip 14 and also extending slightly above the adjacent top edge of the first strip 4 indicating the seam to the same extent that the middle strip is exposed (see FIG. 38). The portion of the pet chew 2 supporting the second side strip 18 is then tied in an overhand knot to create a second knuckle 12 for the bone-shaped pet chew 2 (see FIG. 39). Any excess rawhide of the first strip 4 and the second side strip 18 extending beyond the knot creating the second knuckle 12 may be trimmed away. The bone-shaped pet chew 2, now formed in the desired shape (see FIG. 40), is then slow dried to complete the production process.

In this manner, portions of the flavored second strip 6 remain exposed along a center section 8, on the first knuckle 10, and on the second knuckle 12, to entice chewing and consumption of the bone-shaped pet chew 2 by a pet. Further, because of the techniques used for placement of the sections of the second strip 6, the exposed portions of the second strip 6 are elevated and separated from any generally level decorative surface upon which the pet chew 2 may be dropped or placed. Through the combination of enhancing the second strip 6 (e.g., by flavoring or coloring it) in a manner designed to lock any enhancements into the second strip 6, together with forming the pet chew 2 in a manner designed to minimize contact between the second strip 6 and decorative surfaces upon which the pet chew 2 may come to rest, the pet chew 2 attains the advantage of diminishing the possibility of the pet chew staining decorative surfaces upon which it may come to rest. Even if the second strip 6 were merely coated or basted with a flavored solution (the flavoring thus being more on the surface of the second strip 6 than impregnated into the second strip 6), the exposed portions of the second strip 6 are still elevated and separated from any generally level decorative surface upon which the pet chew 2 may be dropped or placed, again diminishing the possibility of staining.

Figure 46:
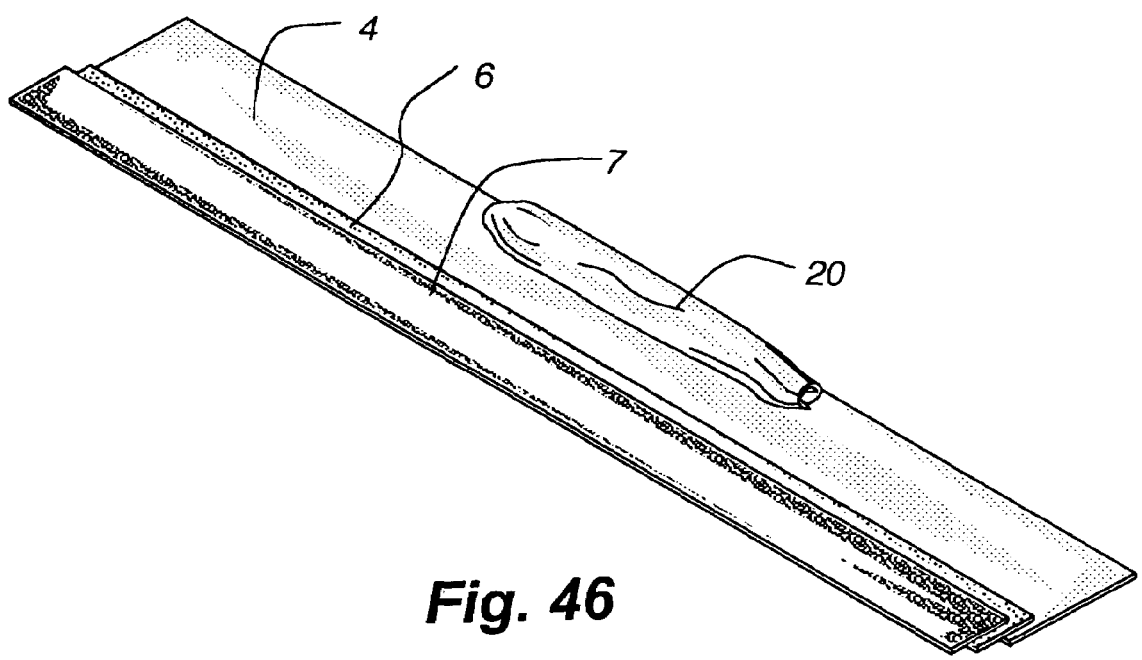
FIG. 46 is a schematic representation of a step in a method of making the rawhide chew bone of FIG. 41.
Figure 47A:
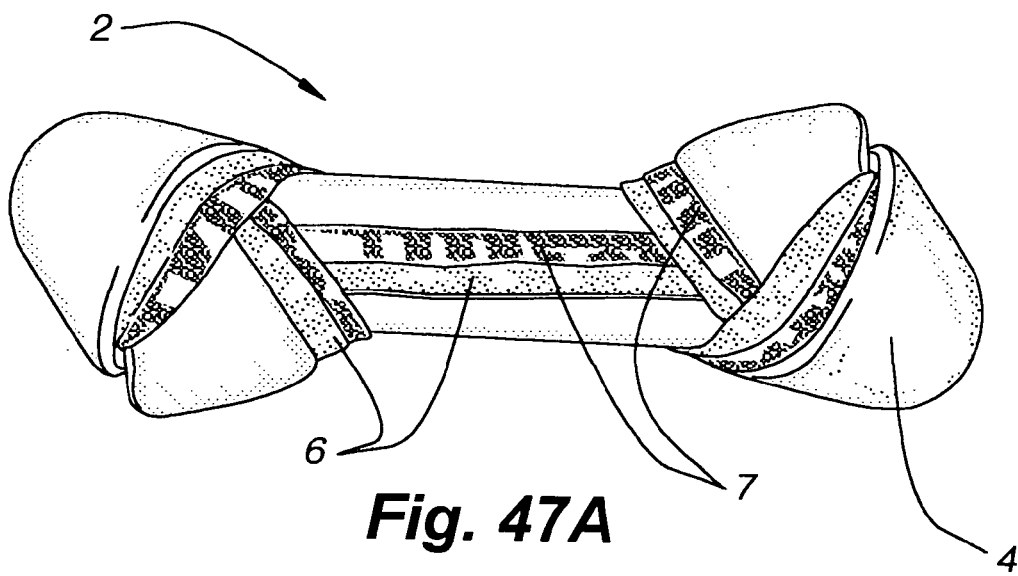
FIG. 47A is a front view of an alternate configuration of the rawhide chew bone of the seventh embodiment.
Figure 47B:
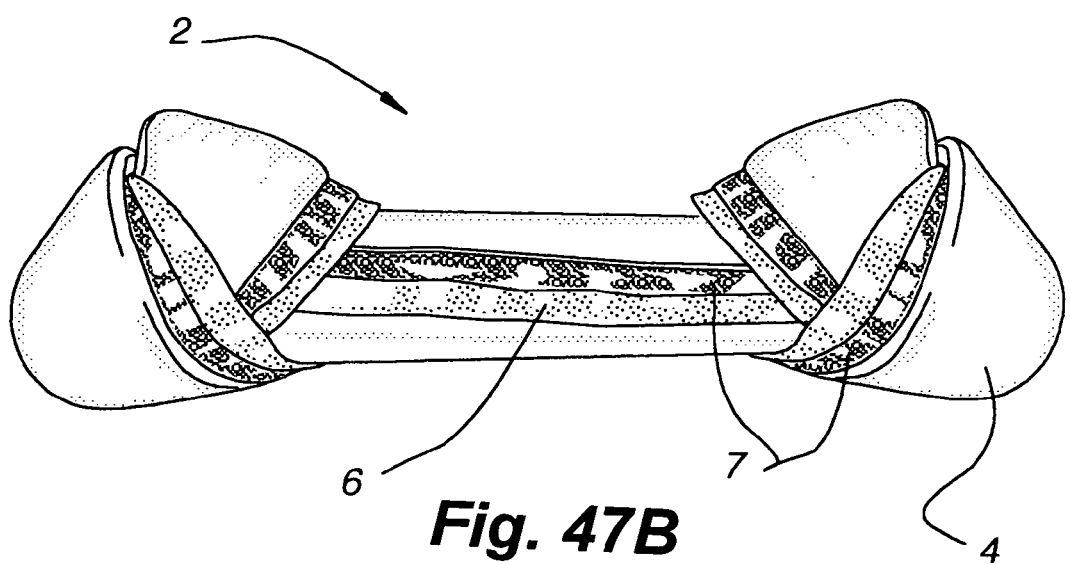
FIG. 47B is a front view of a second alternate configuration of the rawhide chew bone of the seventh embodiment.
Figure 47C:
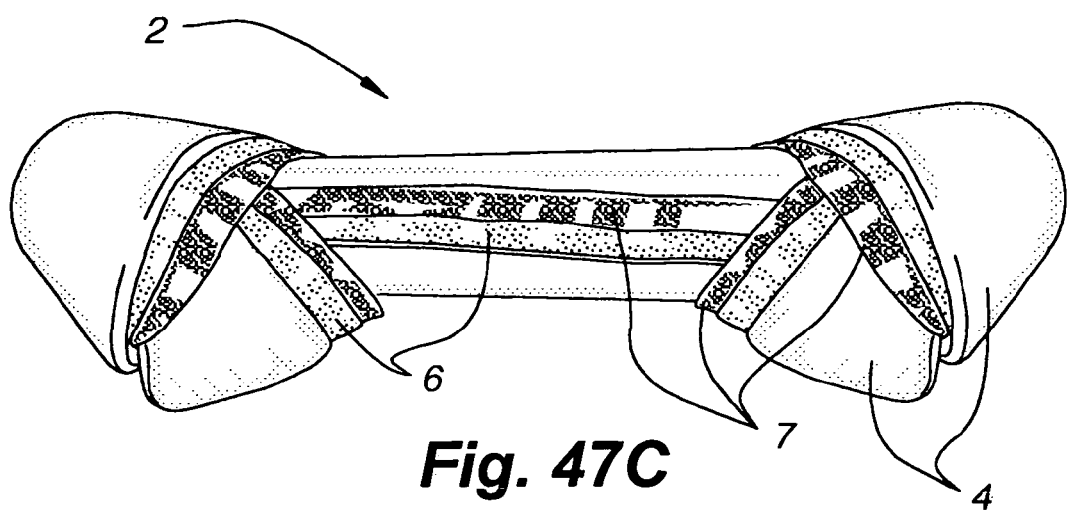
FIG. 47C is a front view of a third alternate configuration of the rawhide chew bone of the seventh embodiment.

In an alternative embodiment of a bone-shaped pet chew 2 as shown in FIGS. 41–45 and 47A–47C, a third strip 7 of rawhide, flavored with respect to the first strip 4 of rawhide, may be included in the pet chew 2. In this embodiment complementary flavors may be provided, for example, chicken and beef, vegetable and cheese, or peanut butter and jelly. It should be apparent that if additional flavor combinations are desired, additional strips of rawhide marinated in other flavors may be provided for incorporation into the bone-shaped pet chew 2 as described herein. Alternately, the two flavored rawhide strips 6, 7 may have the same flavoring. In general, a bone-shape as shown in FIGS. 41 and 47A–47C may be formed by laying the second strip 6 of rawhide on the first strip 4 of rawhide, wherein a lengthwise edge of the second strip 6 extends beyond a lengthwise edge of the first strip 4. The third strip 7 of rawhide may then be layered upon the second strip 6 of rawhide such that a lengthwise edge of the third strip 6 extends beyond the lengthwise edge of the second strip 6, and thereby also extends beyond the lengthwise edge of the first strip 4 as shown in FIG. 46. One or more pieces of remnant rawhide 20 may be center upon the first strip 4 of rawhide to provide added bulk to the shaft of the bone-shape. The first strip 4 of rawhide may then be folded about the second strip 6 of rawhide and the third strip 7 of rawhide partially enveloping each, but allowing the lengthwise edges to protrude. Each lateral end of the folded rawhide strips may then be tied in an overhand knot to form a first knuckle 10 and a second knuckle 12, respectively. FIGS. 47A–47C depict alternate configurations of the knuckle portions of the pet chew 2.

It should be noted that any of the embodiments and/or configurations of the present invention disclosed herein may be manufactured with two or more strips of flavored rawhide 6, 7.

In order to create the specific bone-shaped pet chew 2 of FIGS. 41–45 with the flavored second strip 6 and third strip 7 exposure on the knuckles oriented symmetrically toward the center of the bone, the steps as shown in FIGS. 31–40 and described above, with the addition of the third strip 7 as shown in FIG. 46, may generally be followed. For example, the first strip 4 may be a rectangular-shaped piece of rawhide. The second strip 6 of rawhide may be slightly longer than the first strip 4, but is narrower than the first strip 4. The second strip 6 of rawhide is preferably cut into three sections: a first middle strip 14; a first side strip 16; and a second side strip 18. The third strip 7 of rawhide may be slightly longer than the first strip 4, but is narrower than the first strip 4. The third strip 7 of rawhide is also preferably cut into three sections: a second middle strip (not shown); a third side strip (not shown); and a fourth side strip (not shown).

Following the steps suggested by FIGS. 31–40 and 46, the first strip 4 of rawhide is laid flat on a work surface 21. The first middle strip 14 is then placed centrally along the length of the first strip 4 such that the top edge portion of the first middle strip 14 extends slightly above the adjacent top edge of the first strip 4 as shown to good advantage in FIG. 32. The second middle strip is then placed centrally along the length of the first middle strip 14 such that the top edge portion of the second middle strip extends slightly above the adjacent top edge of the first middle strip 14. Next, the first side strip 16 is placed along the length of the first strip 4 to one side of the middle strip 14, slightly overlapping the adjacent side edge of the middle strip 14 and also extending slightly above the adjacent top edge of the first strip 4. The third side strip is then placed along the length of the first side strip 16 to one side of the middle strip 14, again slightly overlapping the adjacent side edge of the middle strip 14 and also extending slightly above the adjacent top edge of the first side strip 16. Optionally, remnants 20, of rawhide may be placed centrally on the first strip 4 below the first middle strip 14 and second middle strip to add bulk to the bone-shaped pet chew 2.

The bottom quarter to third of the first strip 4 is then folded over, upward toward the first middle strip 14 and second middle strip, and covers at least a portion of the remnants 20. The first strip 4 is further rolled upward to wrap the first middle strip 14, the second middle strip, the first side strip 16, and the second side strip substantially within the first strip 4, while the top edge portions of the first middle strip 14, the second middle strip, the first side strip 16, and the second side strip extend beyond the exterior seam created by rolling the first strip 4. The portion of the pet chew 2 containing the first side strip 16 and third side strip is then tied in an overhand knot to create a first knuckle 10 for the bone-shaped pet chew 2. Any excess rawhide of the first strip 4, the first side strip 16, and the third side strip extending beyond the knot creating the first knuckle 10 may be trimmed away.

The second side strip 18 is next placed within the fold 9 of the rolled first strip 4 on the side opposite the now completed first knuckle 10. The second side strip 18 is placed slightly overlapping the exposed adjacent side edges of the first middle strip 14 and second middle strip and also extending slightly above the adjacent top edge of the first strip 4 indicating the seam to the same extent that the first middle strip 14 and second middle strip are exposed. The fourth side strip is then placed also slightly overlapping the exposed adjacent side edges of the first middle strip 14 and second middle strip and also extending slightly above the adjacent top edge of the second side strip 18. The portion of the pet chew 2 supporting the second side strip 18 and fourth side strip is then tied in an overhand knot to create a second knuckle 12 for the bone-shaped pet chew 2. Any excess rawhide of the first strip 4, the second side strip 18, and the fourth side strip extending beyond the knot creating the second knuckle 12 may be trimmed away. The bone-shaped pet chew 2, now formed in the desired shape (see FIGS. 41–43), is then slow-dried to complete the production process.

In this manner, portions of the flavored second strip 6 and flavored third strip 7 remain exposed along a center section 8, on the first knuckle 10, and on the second knuckle 12, to entice chewing and consumption of the bone-shaped pet chew 2 by a pet. Further, because of the techniques used for placement of the sections of the second strip 6, the exposed portions of the second strip 6 are elevated and separated from any generally level decorative surface upon which the pet chew 2 may be dropped or placed.

Figure 28:
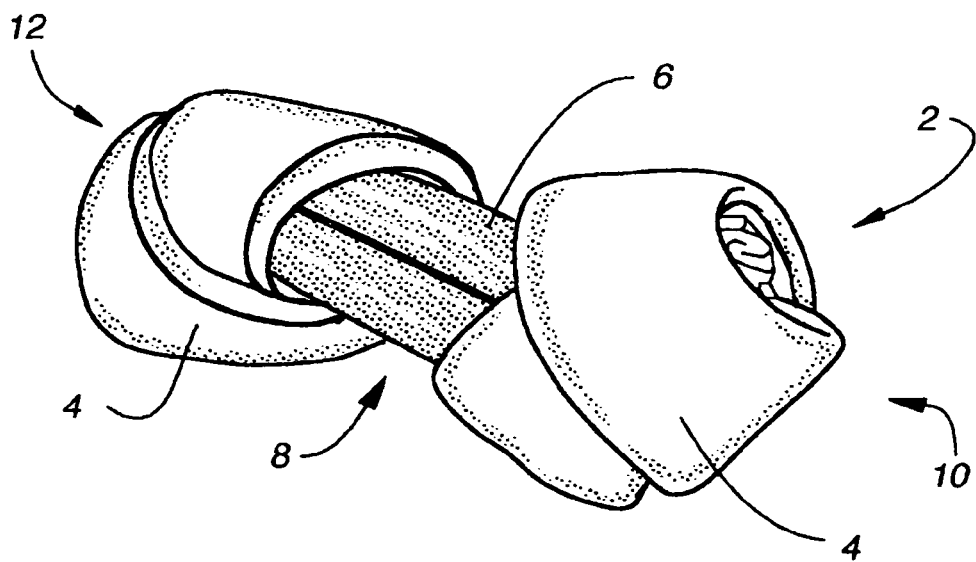
FIG. 28 is an isometric view of an alternate configuration of the rawhide chew bone of the first embodiment.
Figure 29:
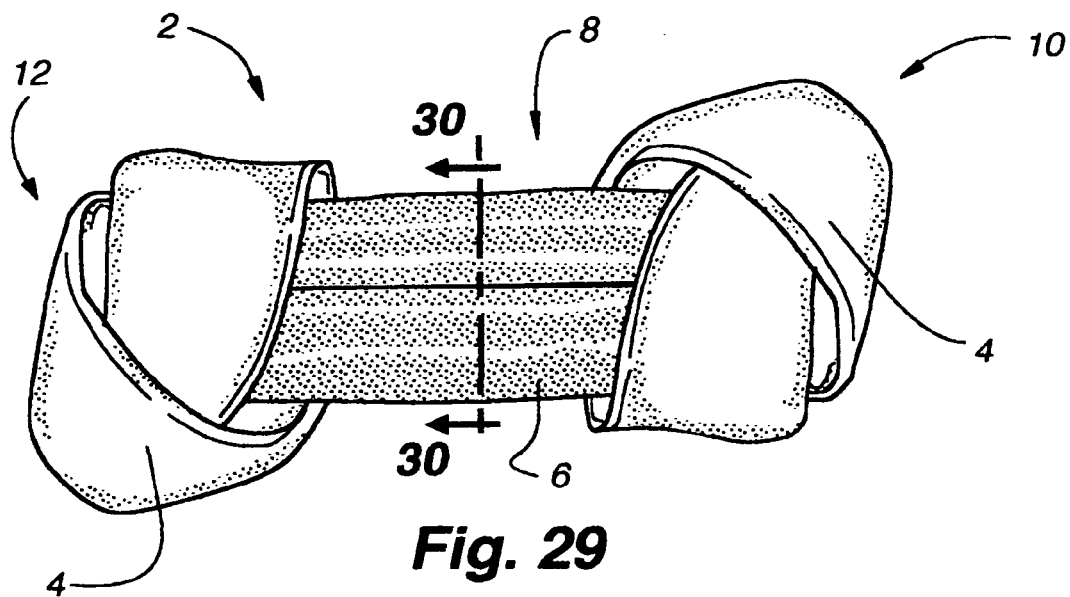
FIG. 29 is a front elevation view of the alternate configuration of the rawhide chew bone of the first embodiment.
Figure 30:
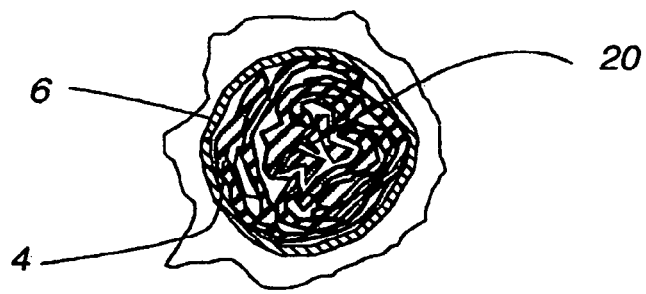
FIG. 30 is a fragmentary cross-section view of the alternate configuration of the rawhide chew bone of FIG. 28 in the plane as indicated in FIG. 29.
Figure 41:
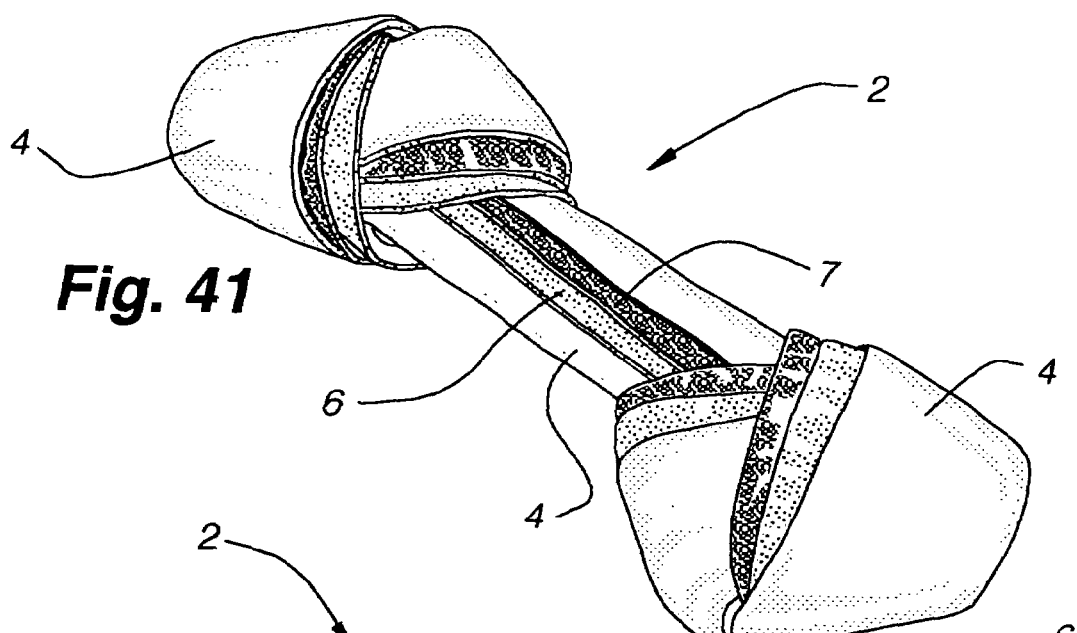
FIG. 41 is an isometric view of a rawhide chew bone according to a seventh embodiment of the invention.
Figure 42:
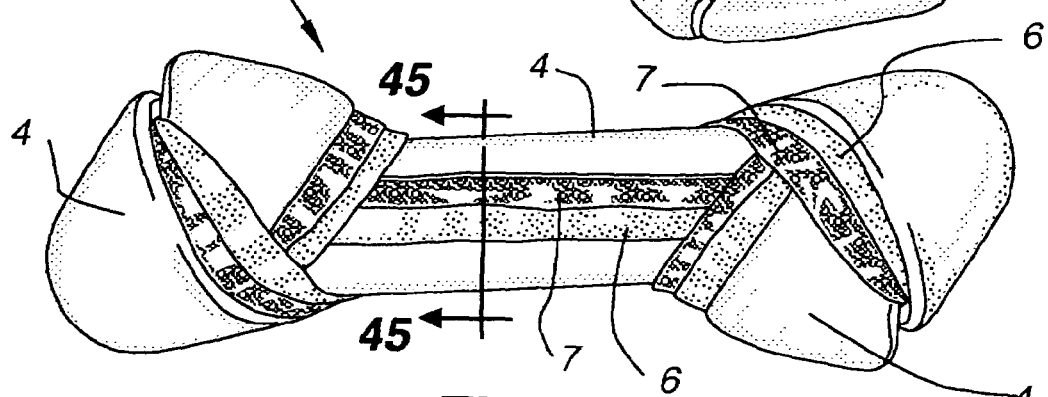
FIG. 42 is a front elevation view of the rawhide chew bone of FIG. 41.
Figure 43:
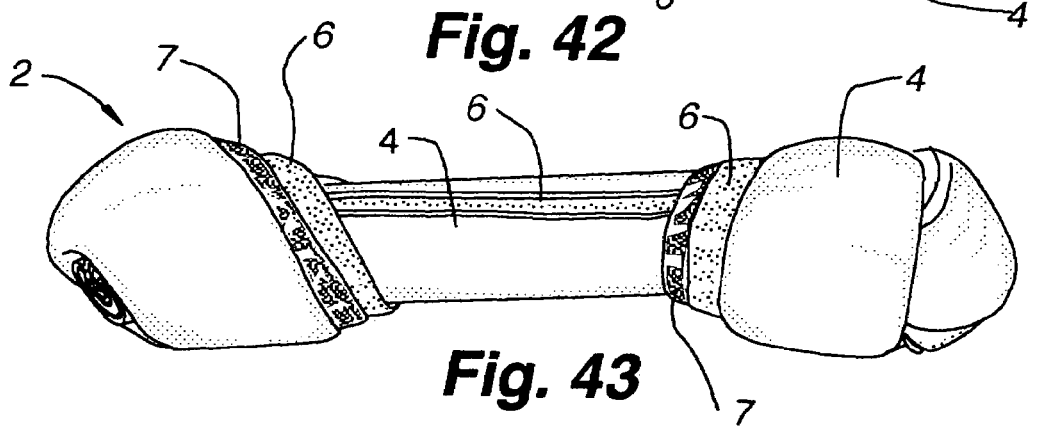
FIG. 43 is an top plan view of the rawhide chew bone of FIG. 41.
Figure 44:
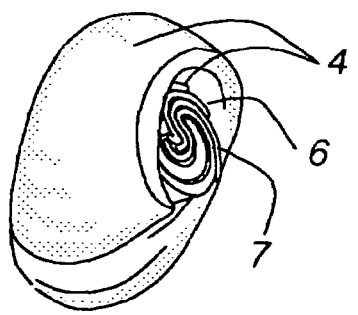
FIG. 44 is an elevation view of the right side of the rawhide chew bone of FIG. 41.
Figure 45:
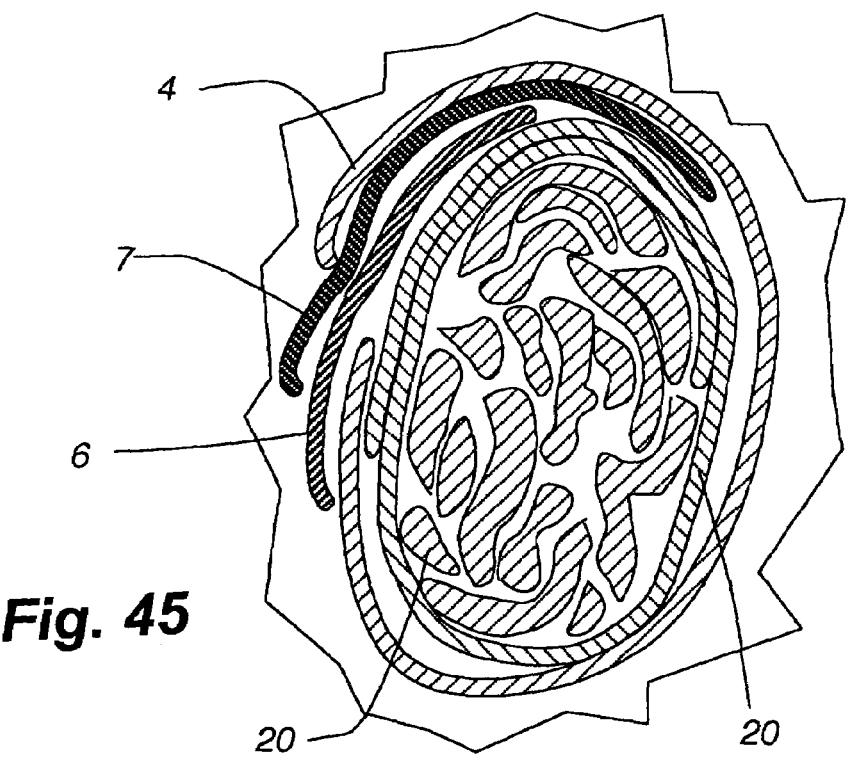
FIG. 45 is a cross-section of the rawhide chew bone of FIG. 41 as indicated in FIG. 43.

In another alternative bone-shaped pet chew embodiment, as shown in FIGS. 28–30, the first strip 4 may simply be rolled upon itself to create a long, cylindrical shape. If desired, remnants 20 of rawhide may be placed centrally on the first strip 4 and wrapped up in the first strip 4 as it is rolled to add bulk to the center section 8 of the pet chew 2 (see FIG. 30). A short flavored second strip 6 of rawhide is then wrapped around the center section 8. Each lateral side of the first strip 4 is then tied in an overhand knot to create the first knuckle 10 and the second knuckle 12 of the bone-shaped pet chew 2. In this configuration, the second strip 6 is elevated above any decorative surface upon which the pet chew 2 may rest by the larger diameter of the first knuckle 10 and the second knuckle 12.

Figure 7:
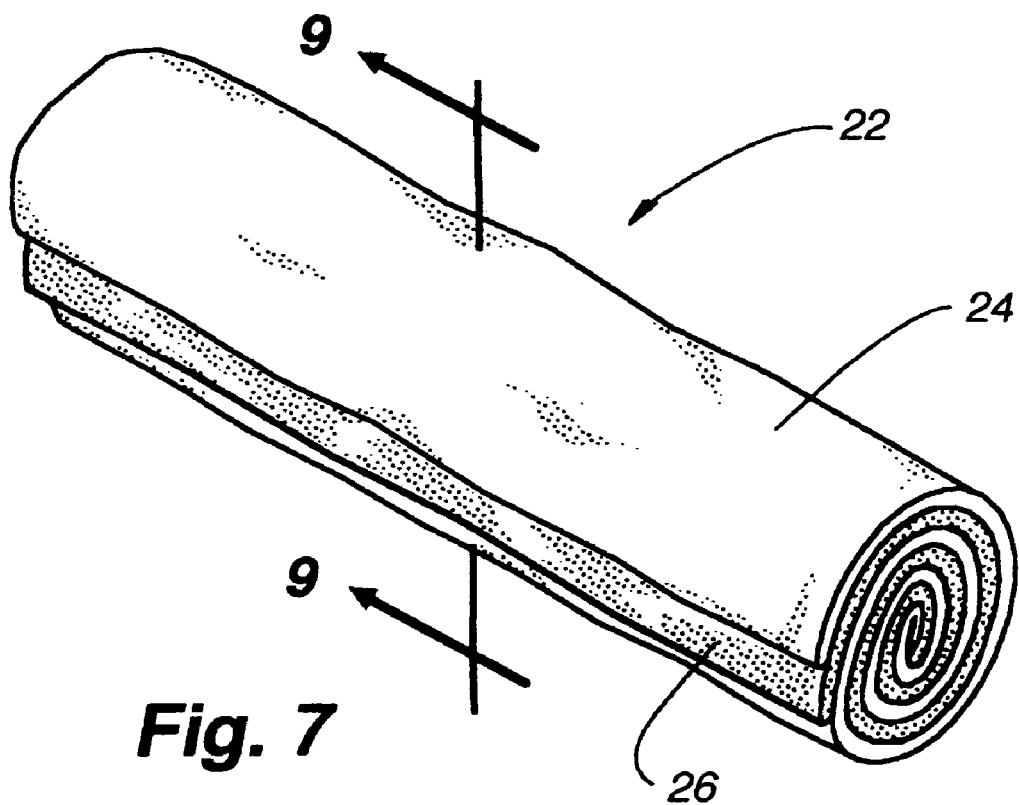
FIG. 7 is an isometric view of a rawhide chew roll according to a second embodiment of the invention.
Figure 9:
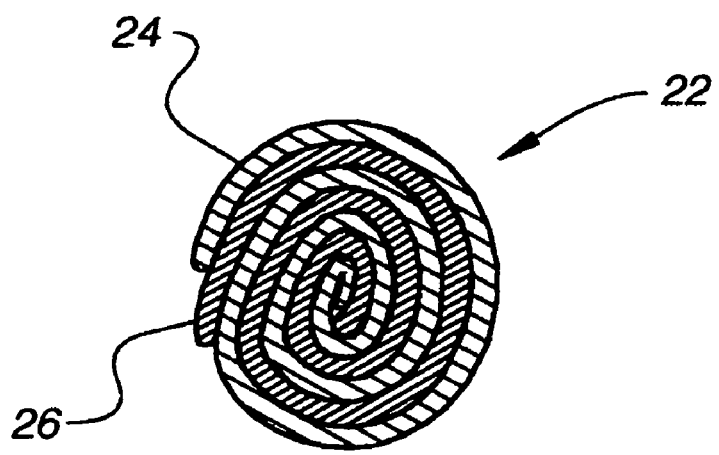
FIG. 9 is a cross-section of the rawhide chew roll of FIG. 7 in a plane as indicated in FIG. 7.
Figure 8:
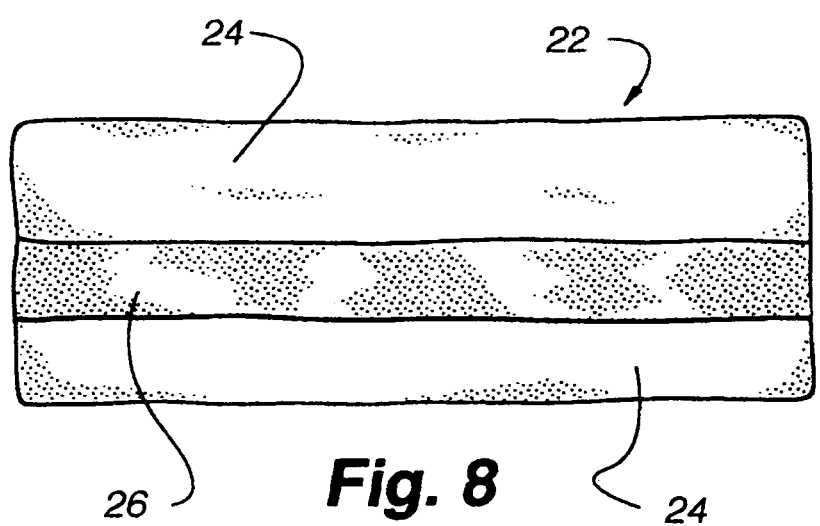
FIG. 8 is a front elevation view of the rawhide chew roll of FIG. 7.

A second embodiment of the invention is depicted in FIGS. 7–9 as a roll-shaped pet chew 22. The roll-shaped pet chew 22 may be formed of a first sheet 24 of rawhide cut in the shape of square or rectangle and a second sheet 26 of rawhide, also cut in the shape of a similarly sized square or rectangle. The second sheet 26 of rawhide is flavored according to one of the processes described above. The second sheet 26 is placed upon the first sheet 24 in the same general orientation, with one edge extending beyond an adjacent edge of the first sheet 24. The first sheet 24 and second sheet 26 are then rolled together, the second sheet 26 concentrically within the first sheet 24 to form a cylindrical roll 22. As viewed from an end in FIG. 9, the roll-shaped pet chew 22 appears as a two-layered spiral pattern. While the second sheet 26 is substantially enclosed within the first sheet 24, the roll-shaped pet chew 22 is rolled such that an edge of the second sheet 26 extends beyond the exterior edge of the first sheet 24 and remains exposed to entice chewing and consumption of the roll-shaped pet chew 22 by a pet.

In this embodiment, while the exposed edge of the second sheet 24 may contact a decorative surface upon which the roll-shaped pet chew 22 rests, the contact is minimized because the vast majority of the exterior surface of the roll-shaped pet chew is composed of the first sheet 24. Further, because the second sheet 26 is desirably impregnated with the flavoring, which is thus absorbed into the rawhide fibers, rather than being coated or basted, the likelihood of transferring any dye or flavoring to a decorative surface is reduced because the dye or flavoring is less prone to contacting the decorative surface and is less prone to bleed or rub off if it does contact the decorative surface.

Figure 10:
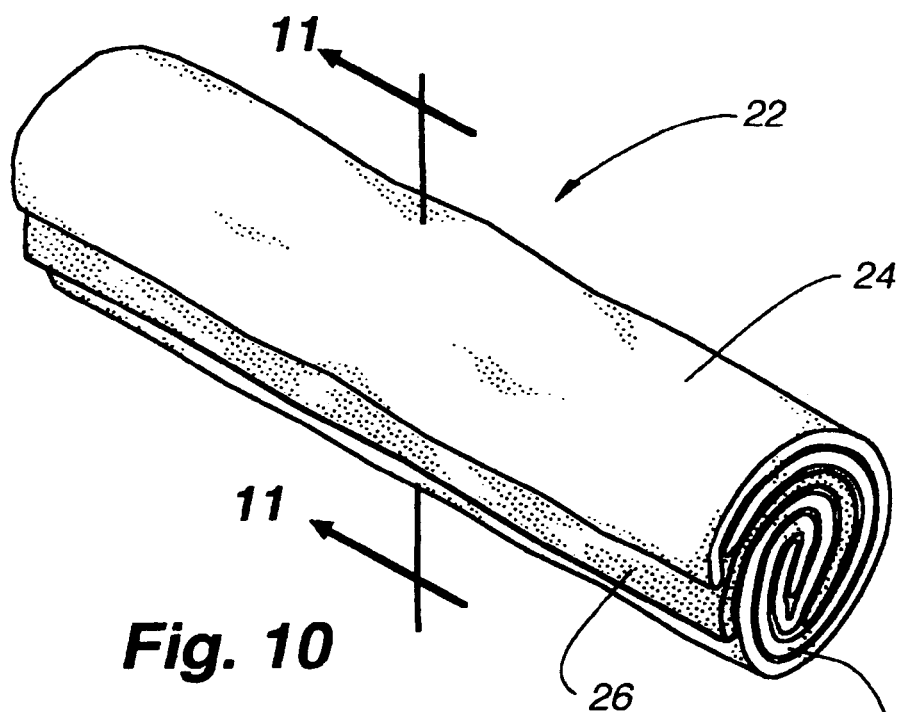
FIG. 10 is an isometric view of a rawhide chew roll according to an alternate configuration of the second embodiment of the invention, which alternate configuration shares the same front elevation view as the second embodiment.
Figure 11:
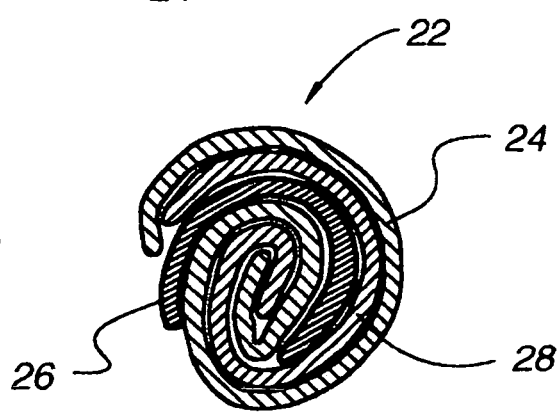
FIG. 11 is a cross-section of the rawhide chew roll of the alternate configuration of the second embodiment in a plane as indicated in FIG. 10.

In an alternative embodiment shown in FIGS. 10 and 11, a third sheet 28 of standard whitened rawhide may be rolled within the roll-shaped pet chew 22 to achieve additional bulk and size. The third sheet 28 of rawhide is placed upon the first sheet 24. The second sheet 26 is then placed upon the third sheet 28 with one edge of the second sheet 26 extending beyond a complementary edge of the first sheet 24. The first sheet 24, second sheet 26, and third sheet 28 are then rolled together, the second sheet 26 and third sheet 28 concentrically within the first sheet 24 to form a cylindrical roll. As before, the second sheet 26 is substantially enclosed within the first sheet 24. The roll-shaped pet chew 22 is again rolled such that an edge of the second sheet 26 extends beyond the exterior edge of the first sheet 24 and remains exposed to entice chewing and consumption of the roll-shaped pet chew 22 by a pet. An edge of the third sheet 28 may or may not extend beyond the exterior edge of the first sheet 24.

In an alternative embodiment shown in FIGS. 48–50, a fourth sheet 29 of rawhide, in addition to the second sheet 26, may be rolled within the roll-shaped pet chew 22 to provide an additional flavor or simply more of the same flavor as the second sheet 26. The fourth sheet 29 of rawhide is also flavored according to one of the processes described above. In this embodiment complementary flavors may be provided, for example, chicken and beef, vegetable and cheese, or peanut butter and jelly. It should be apparent that if additional flavor combinations are desired, additional strips of rawhide marinated in other flavors may be provided for incorporation into the roll-shaped pet chew as described herein. If additional bulk is desired, a third sheet 28 of standard whitened rawhide may be included in the roll-shaped pet chew 22, as in the embodiment of FIGS. 10 and 11.

The third sheet 28 may be placed upon the first sheet 24 in the same general orientation as the first sheet 24. The second sheet 26 is placed upon the third sheet 28 in the same general orientation, with one edge extending beyond an adjacent edge of the first sheet 24. The fourth sheet 29 is then placed upon the second sheet 26 in the same general orientation, with one edge extending beyond an adjacent edge of the first sheet 24. Alternately, the third sheet 28 may be placed between the second sheet 26 and the fourth sheet 29, or upon only the fourth sheet 29 after the second sheet 26 and fourth sheet 29 have been previously placed upon the first sheet 24. The first sheet 24, second sheet 26, third sheet 28, and fourth sheet 29 are then rolled together, the second sheet 26, third sheet 28, and fourth sheet 29 concentrically within the first sheet 24 to form a cylindrical roll 22. As viewed from an end as seen in FIG. 48, or in cross-section as in FIG. 50, the roll-shaped pet chew 22 appears as a multi-layered spiral pattern. While the second sheet 26 and fourth sheet 29 are substantially enclosed within the first sheet 24, the roll-shaped pet chew 22 is rolled such that an edge of both the second sheet 26 and fourth sheet 29 extend beyond the exterior edge of the first sheet 24 and remain exposed to entice chewing and consumption of the roll-shaped pet chew 22 by a pet. The fourth sheet 29 extends from underneath the second sheet 26 to ensure that it is not covered by the second sheet 26. An edge of the third sheet 28 may or may not extend beyond the exterior edge of the first sheet 24.

Figure 16:
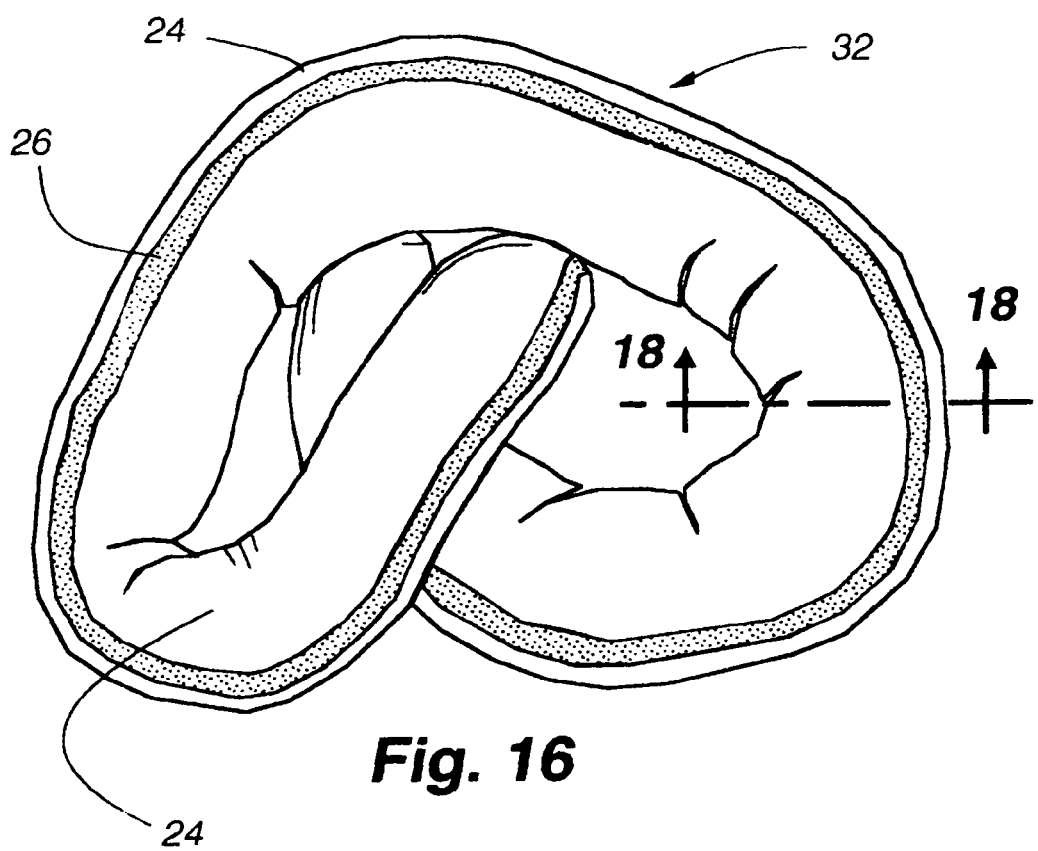
FIG. 16 is a top plan view of a rawhide chew of a fourth embodiment of the invention in the shape of a pretzel.
Figure 17:
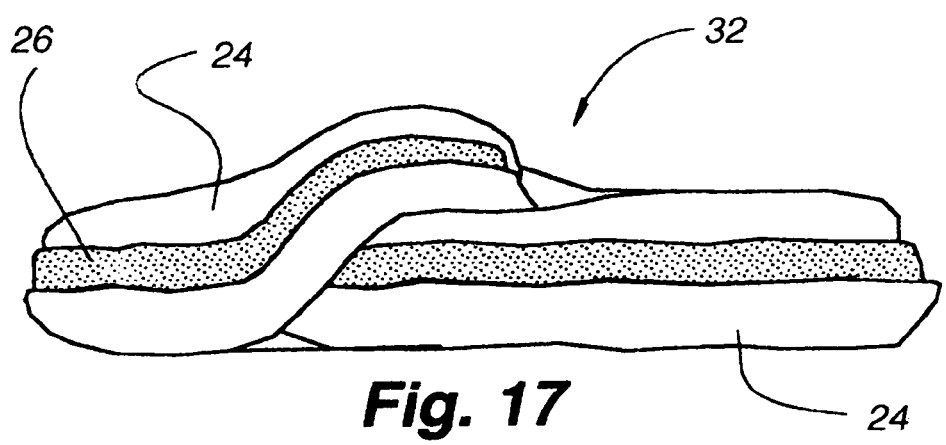
FIG. 17 is an elevation view of the rawhide chew pretzel of FIG. 16.
Figure 18:
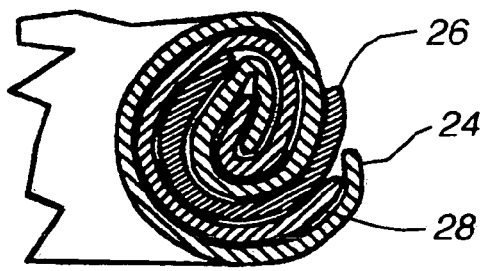
FIG. 18 is a fragmentary cross-section of the rawhide chew pretzel of FIG. 16 in a plane as indicated in FIG. 16.
Figure 19:
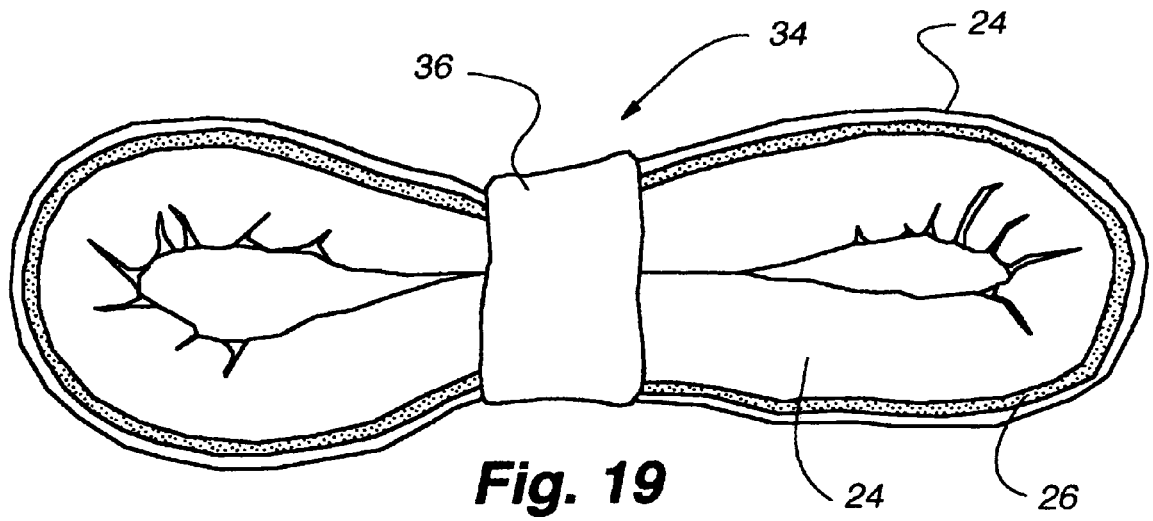
FIG. 19 is a top plan view of a rawhide chew of a fifth embodiment of the invention in the shape of a bow.
Figure 20:
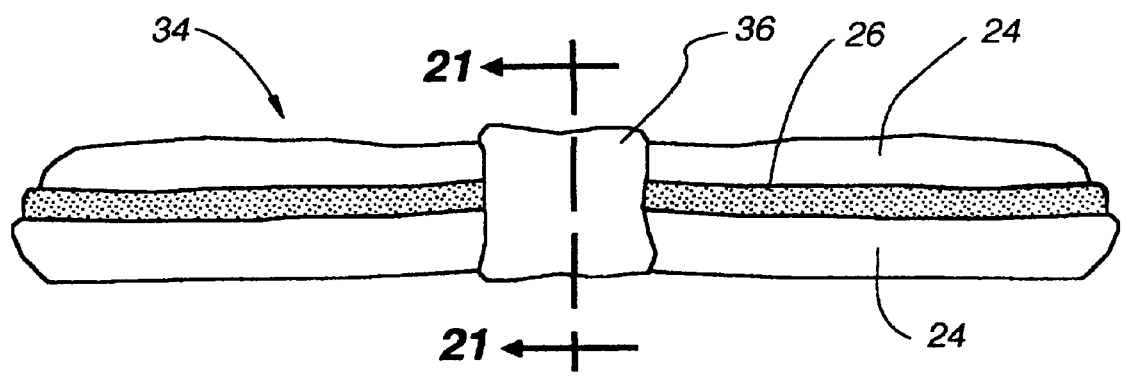
FIG. 20 is a front elevation view of the rawhide chew bow of FIG. 19.
Figure 21:
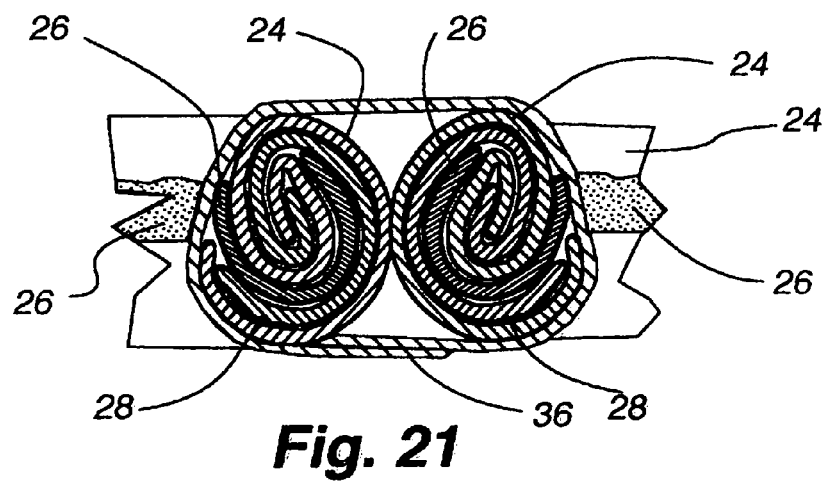
FIG. 21 is a fragmentary cross section of the rawhide chew bow of FIG. 19 in a plane as indicated in FIG. 20.

From the basic roll-shaped pet chew 22, additional shapes of pet chews may be created that are biased in an orientation resistant to the happenstance that an exposed portion of the second sheet 26 will touch a decorative surface when the pet chew is placed upon the decorative surface. For example, a lengthy roll-shaped pet chew 22 may be formed in the shape of a donut or bagel 30 as shown in FIGS. 12–15. A pretzel-shaped pet chew 32, as shown in FIGS. 16–18, may also be formed by appropriately wrapping and crossing the ends of a lengthy roll-shaped pet chew 22. Further, a figure-8 or bow-shaped pet chew 34 may be formed as depicted in FIGS. 19–21 by placing the ends of a lengthy roll-shaped pet chew 22 together, pinching the ends of the roll to the midpoint of the roll, and banding the pinched section together with an additional piece of rawhide 36. By arranging roll-shaped pet chews 22 in these additional configurations, and arranging the exposed edge of the second sheet 26 to be located on a side wall of the pet chews as shown in FIGS. 12, 13, 16, 17, and 19–21, the possibility of the exposed edge of the second sheet 26 coming into contact with a decorative surface is reduced.

Figure 22:
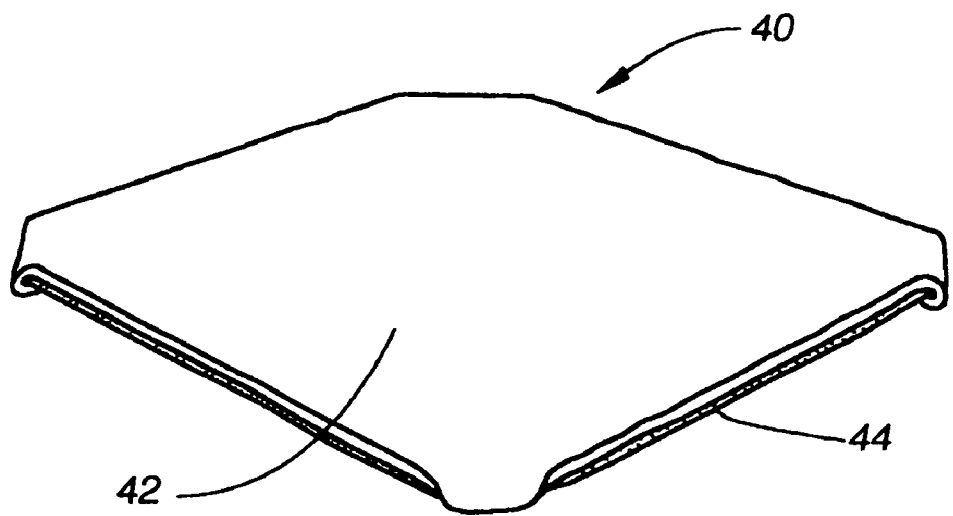
FIG. 22 is top isometric view of a rawhide chew of a sixth embodiment of the invention in the configuration of a chip.
Figure 23:
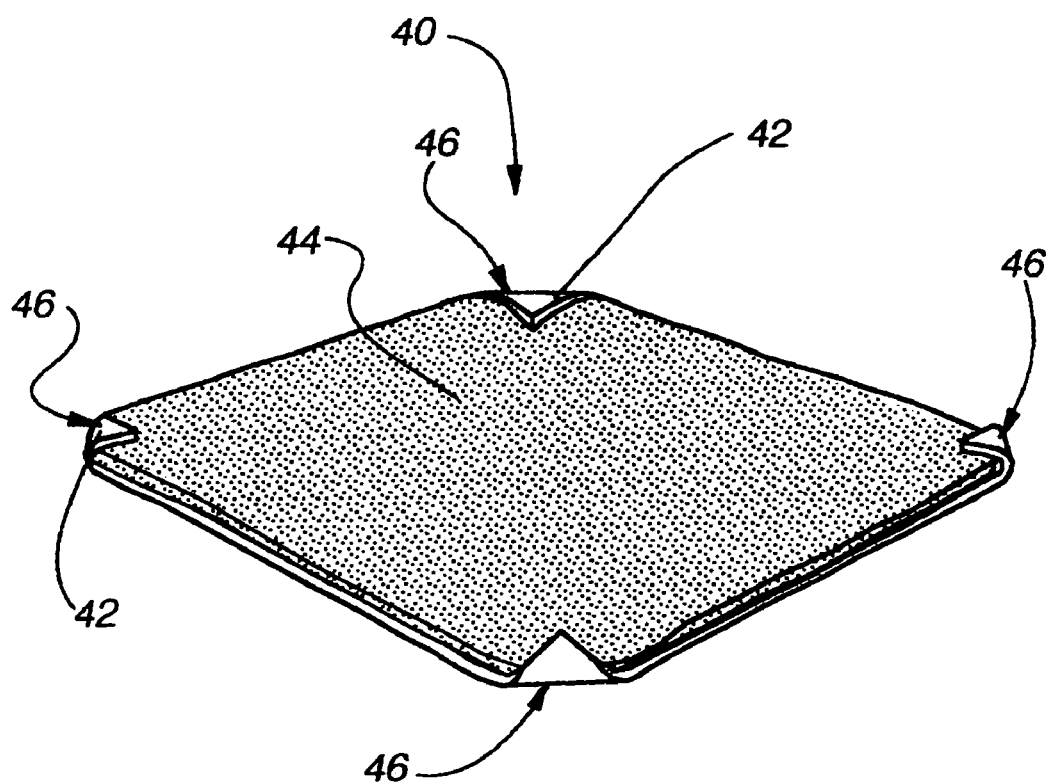
FIG. 23 is a bottom isometric view of the rawhide chew chip of FIG. 22.

A further embodiment shown in FIGS. 22 and 23 is a pet chew chip 40. The pet chew chip 40 may be any of various shapes, for example, square, triangular, circular, oval, or any other polygonal or curvilinear shape. In the exemplary embodiments depicted, the pet chew chip 40 is in the shape of a square. A first sheet 42 of rawhide is used as a base to support a second sheet 44 of rawhide. The second sheet 44 of rawhide is flavored according to one of the processes described above. The corners 46 of the first sheet 42 may be folded over the corners or other sections along the edges of the second sheet 44. Upon completion of the drying process, the second sheet 44 is attached to the first sheet 42 by the corners 46 of the first sheet 42, which have stiffened to hold the second sheet 44 in place. In this embodiment, the second sheet 44 is prevented by the first sheet 42 from contacting a generally flat surface, while the majority of the second sheet remains exposed to entice chewing and consumption of the pet chew chip 40 by a pet. The first sheet 42 covers one side of the second sheet 44, and the corners 46 of the first sheet 42 folded over the second sheet 44 raise the second sheet 44 above any decorative surface upon which the pet chew chip 40 may rest.

In a variation on the pet chew chip 40 depicted in FIGS. 22 and 23, a third sheet 48 of rawhide may be placed opposite the first sheet 42 to create a sandwich pet chew chip 50 as shown in FIGS. 24–27. In this embodiment, the first sheet 42 and the third sheet 48 sandwich the second sheet 44 between them. The third sheet 48 may be offset in orientation to the first sheet 42 and second sheet 44, and the corners of the third sheet 48 may fold over adjacent edges of the first sheet 42 and the second sheet 44. In this embodiment, it may be unnecessary to fold the corners 46 of the first sheet 42 over the second sheet 44 as shown in FIGS. 24–27. Upon completion of the drying process, the second sheet 44 is attached to both the first sheet 42 and the third sheet 48 by the corners 52 of the third sheet 48, which have stiffened to clasp against the first sheet 42 and thereby hold the third sheet 48 against the second sheet 44. The corners 54 of the second sheet 44 are thereby exposed to entice chewing and consumption of the sandwich pet chew chip 50 by a pet.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A rawhide pet chew comprising:
   a first sheet of rawhide; and
   a second sheet of rawhide that is impregnated by a first marinade with a first flavor, relative to the first sheet of rawhide, wherein the first flavor is appetizing to a pet,
   a third sheet of rawhide that is impregnated by a second marinade with a second flavor, relative to the first sheet of rawhide, wherein the second flavor is appetizing to a pet, and wherein
   the first sheet of rawhide is folded about both the second sheet of rawhide and the third sheet of rawhide.

2. The rawhide pet chew of claim 1, wherein only portions of the first sheet of rawhide contact a generally flat surface, to the exclusion of the second sheet of rawhide and the third sheet of rawhide, when the rawhide pet chew is placed upon the generally flat surface.

3. The rawhide pet chew of claim 1, wherein the first sheet of rawhide substantially covers the second sheet of rawhide while a portion of the second sheet of rawhide remains exposed.

4. The rawhide pet chew of claim 1, wherein the first sheet of rawhide substantially covers the third sheet of rawhide while a portion of the third sheet of rawhide remains exposed.

5. The rawhide pet chew of claim 1, wherein the first marinade is the same as the second marinade whereby the first flavor is the same as the second flavor.

6. The rawhide pet chew of claim 1, wherein the pet chew comprises a shape selected from the group of shapes comprising a bone, a roll, a donut, a bow, a pretzel, a figure eight, and a chip.

7. A method of making a rawhide pet chew comprising:
   providing a first sheet of rawhide;
   providing a second sheet of rawhide that is impregnated by a first marinade with a first flavor, relative to the first sheet of rawhide, wherein the first flavor is appetizing to a pet;
   providing a third sheet of rawhide that is impregnated by a second marinade with a second flavor, relative to the first sheet of rawhide, wherein the second flavor is appetizing to a pet; and
   folding the first sheet of rawhide about both the second sheet of rawhide and the third sheet of rawhide, wherein a portion of both the second sheet of rawhide and the third sheet of rawhide remains exposed.

8. The method of claim 7 further comprising washing and whitening the first sheet of rawhide, the second sheet of rawhide, and the third sheet of rawhide.

9. The method of claim 8 further comprising partially drying the second sheet of rawhide and the third sheet of rawhide after the steps of washing and whitening the second sheet of rawhide and the third sheet of rawhide.

10. The method of claim 8 further comprising dying the second sheet of rawhide.

11. The method of claim 8 further comprising dying the third sheet of rawhide.

12. The method of claim 7 further comprising drying the rawhide pet chew.

13. The method of claim 12, wherein the step of folding is performed before the step of drying.

14. A method of making a rawhide pet chew bone comprising:
   providing a first sheet of rawhide;
   providing a second sheet of rawhide that is impregnated by a first marinade with a first flavor, relative to the first sheet of rawhide, wherein the first flavor is appetizing to a pet;
   providing a third sheet of rawhide that is impregnated by a second marinade with a second flavor, relative to the first sheet of rawhide, wherein the second flavor is appetizing to a pet;
   cutting a first strip from the first sheet of rawhide;

cutting a second strip from the second sheet of rawhide;
cutting a third strip from the third sheet of rawhide;
placing the second strip along the first strip, wherein a longitudinal edge of the second strip extends past a longitudinal edge of the first strip;
placing the third strip along the second strip, wherein a longitudinal edge of the third strip extends past the longitudinal edge of the second strip;
folding the first strip over a first portion of the second strip and a first portion of the third strip, wherein a second portion of the second strip and a second portion of the third strip remain exposed;
tying a first overhand knot in a first lateral end of the first strip together with the second strip and the third strip to form a first knuckle;
tying a second overhand knot in a second lateral end of the first strip together with the second strip and the third strip to form a second knuckle;
trimming any excess of the first strip, the second strip, and the third strip extending beyond the first overhand knot; and
trimming any excess of the first strip, the second strip, and the third strip extending beyond the second overhand knot.

15. The method of claim 14 further comprising:
dividing the second strip into a first section, a second section, and a third section;
dividing the third strip into a fourth section, a fifth section, and a sixth section,; and wherein:
the step of placing further comprises:
  placing the first section upon a center portion of the first strip, extending past the longitudinal edge of the first strip;
  placing the fourth section upon the first section, extending past the longitudinal edge of the first section;
  placing the second section on the first lateral end of the first strip, extending past the longitudinal edge along the first lateral end of the first strip;
  placing the fifth section on the second section, extending past the longitudinal edge of the second section;
  placing the third section within a fold in the second lateral end of the first strip, wherein the third section is substantially covered by the first strip, but a portion of the third section extends past the longitudinal edge along the second lateral end of the first strip and remains exposed;
  placing the sixth section within a fold in the second lateral end of the first strip, wherein the sixth section is substantially covered by the first strip, but a portion of the sixth section extends past the longitudinal edge of the third section and remains exposed;
the step of folding further comprises:
  folding the first strip over a majority of each of the first section, the second section, the fourth section, and the fifth section, wherein
    a center section of the pet chew bone is formed by the enclosure of the first section and the fourth section within the first strip;
    a portion of each of the first section and the fourth section remain exposed; and
    the second section and the fifth section on the first lateral end are substantially covered by the first strip, but a portion of each of the second section and the fifth section remain exposed;
the first step of tying further comprises tying a first overhand knot in the first lateral end of the first strip together with the second section and the fifth section to form a first knuckle;
the second step of tying further comprises tying a second overhand knot in the second lateral end of the first strip together with the third section and the sixth section to form a second knuckle;
the first step of trimming further comprises trimming any excess of the first strip, the second section, and the fifth section extending beyond the first overhand knot; and
the second step of trimming further comprises trimming any excess of the first strip, the third section, and the sixth section extending beyond the second overhand knot.

16. The method of claim 15 further comprising placing a remnant piece of rawhide upon the center portion of the first strip, wherein the remnant piece of rawhide is wrapped within the center section of the pet chew bone.

17. A rawhide pet chew bone comprising:
a first strip of rawhide; and
a second strip of rawhide that is impregnated by a first marinade with a first flavor, relative to the first strip of rawhide, wherein the first flavor is appetizing to a pet; wherein
a third strip of rawhide that is impregnated by a second marinade with a second flavor, relative to the first strip of rawhide, wherein the second flavor is appetizing to a pet; and wherein
  the second strip of rawhide is positioned substantially within a fold of the first strip of rawhide while an edge of the second strip of rawhide remains exposed;
  the third strip of rawhide is positioned substantially within the fold of the first strip of rawhide while an edge of the third strip of rawhide remains exposed;
  a first lateral portion of the first strip of rawhide containing the second strip of rawhide and the third strip of rawhide is tied into a first overhand knot forming a first knuckle; and
  a second lateral portion of the first strip of rawhide containing the second strip of rawhide and the third strip of rawhide is tied into a second overhand knot forming a second knuckle.

18. The rawhide pet chew bone of claim 17, wherein:
the second strip of rawhide is divided into a first section, a second section and a third section;
the third strip of rawhide is divided into a fourth section, a fifth section, and a sixth section;
the first section is positioned substantially within a central portion of the first strip while an edge of the first section remains exposed;
the fourth section is positioned substantially within a central portion of the first strip while an edge of the fourth section remains exposed;
the second section is positioned substantially within the first lateral portion of the first strip while an edge of the second section remains exposed;
the fifth section is positioned substantially within the first lateral portion of the first strip while an edge of the fifth section remains exposed;
the third section is positioned substantially within the second lateral portion of the first strip while an edge of the third section remains exposed; and
the sixth section is positioned substantially within the second lateral portion of the first strip while an edge of the sixth section remains exposed.

19. The rawhide pet chew bone of claim 17 further comprising a remnant piece of rawhide wrapped within a central portion of the first strip of rawhide.

20. The rawhide pet chew bone of claim 17, wherein only a portion of the first knuckle and a portion of the second knuckle contact a generally flat surface, to the exclusion of the second strip of rawhide and the third strip of rawhide, when the rawhide pet chew bone is placed upon the generally flat surface.

21. The rawhide pet chew bone of claim 17, wherein the first marinade is the same as the second marinade whereby the first flavor is the same as the second flavor.

22. A method of making a rawhide pet chew roll comprising:
providing a first sheet of rawhide;
providing a second sheet of rawhide that is impregnated by a first marinade with a first flavor, relative to the first sheet of rawhide, wherein the first flavor is appetizing to a pet;
providing a third sheet of rawhide that is impregnated by a second marinade with a second flavor, relative to the first sheet of rawhide, wherein the second flavor is appetizing to a pet;
cutting a first strip from the first sheet of rawhide;
cutting a second strip from the second sheet of rawhide;
cutting a third strip from the third sheet of rawhide;
placing the second strip on the first strip; and
placing the third strip on the second strip; and
rolling the second strip and the third strip substantially within the first strip, wherein an edge of the second strip and an edge of the third strip remain exposed.

23. The method of claim 22 further comprising forming the rawhide pet chew roll into a shape selected from the group of shapes comprising a donut, a bow, a pretzel, and a figure eight.

24. A rawhide pet chew roll comprising:
a first strip of rawhide;
a second strip of rawhide that is impregnated by a first marinade with a first flavor, relative to the first strip of rawhide, wherein the first flavor is appetizing to a pet; and
a third strip of rawhide that is impregnated by a second marinade with a second flavor, relative to the first strip of rawhide, wherein the second flavor is appetizing to a pet; wherein
the second strip of rawhide is rolled substantially within the first strip of rawhide while an edge of the second strip of rawhide remains exposed; and
the third strip of rawhide is rolled substantially within the first strip of rawhide while an edge of the third strip of rawhide remains exposed.

25. The rawhide pet chew roll of claim 24, wherein the rawhide pet chew roll is formed into a shape that is biased in an orientation wherein only a portion of the first strip of rawhide contacts a generally flat surface, to the exclusion of the second strip of rawhide and the third strip of rawhide, when the rawhide pet chew roll is placed upon the generally flat surface.

26. The rawhide pet chew roll of claim 25, wherein the shape is selected from the group of shapes comprising a donut, a bow, a pretzel, and a figure eight.

27. The rawhide pet chew of claim 24, wherein the first marinade is the same as the second marinade whereby the first flavor is the same as the second flavor.

* * * * *